(12) United States Patent
Maeno

(10) Patent No.: US 10,627,828 B2
(45) Date of Patent: Apr. 21, 2020

(54) AUTONOMOUS MOVEMENT DEVICE, AUTONOMOUS MOVEMENT METHOD AND PROGRAM RECORDING MEDIUM

(71) Applicant: CASIO COMPUTER CO., LTD., Shibuya-ku, Tokyo (JP)

(72) Inventor: Yasushi Maeno, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/982,354

(22) Filed: May 17, 2018

(65) Prior Publication Data
US 2019/0004520 A1 Jan. 3, 2019

(30) Foreign Application Priority Data

Jun. 30, 2017 (JP) .................................. 2017-129015
Oct. 30, 2017 (JP) .................................. 2017-208778

(51) Int. Cl.
*G05D 1/02* (2020.01)

(52) U.S. Cl.
CPC ........... *G05D 1/024* (2013.01); *G05D 1/0214* (2013.01); *G05D 1/0223* (2013.01); *G05D 1/0236* (2013.01); *G05D 1/0274* (2013.01)

(58) Field of Classification Search
USPC ....................................................... 701/420
See application file for complete search history.

(56) References Cited

U.S. PATENT DOCUMENTS

| | | | | |
|---|---|---|---|---|
| 6,809,490 B2* | 10/2004 | Jones | ................... | G05D 1/0219 318/568.12 |
| 8,077,075 B2* | 12/2011 | Randler | ................ | G01S 13/345 342/104 |
| 8,130,138 B2* | 3/2012 | Kikuchi | ................ | G01S 7/2921 342/118 |
| 8,570,213 B2* | 10/2013 | Nishiyama | .............. | G01S 7/046 342/159 |
| 8,849,494 B1* | 9/2014 | Herbach | ................ | B60W 30/00 701/24 |
| 9,255,813 B2* | 2/2016 | Liu | ......................... | G06F 3/011 |

(Continued)

FOREIGN PATENT DOCUMENTS

| | | | | |
|---|---|---|---|---|
| FR | 2954518 A1 * | 6/2011 | ............ | B25J 9/1671 |
| JP | 2010102485 A | 5/2010 | | |

OTHER PUBLICATIONS

Song, Hao, et al., A Progressive Point Cloud Simplification Algorithm With Preserved Shard Edge Data, Int J Adv Manuf Technol (2009) 45:583-592 (https://link.springer.conn/content/pdf/10.1007%2Fs00170-009-1980-4.pdf) (hereinafter "Song").US8849494B.*

(Continued)

*Primary Examiner* — Jean Paul Cass
(74) *Attorney, Agent, or Firm* — Holtz, Holtz & Volek PC

(57) ABSTRACT

An autonomous movement device includes an obstacle detector, a map creator, an obstacle canceller, and a router. The obstacle detector detects an obstacle. The map creator records information about the obstacle detected by the obstacle detector on an environment map. The obstacle canceller cancels the information about the obstacle recorded by the map creator from the environment map. The router sets a moving route based on the information recorded on the environment map.

8 Claims, 22 Drawing Sheets

(56) References Cited

U.S. PATENT DOCUMENTS

| | | | |
|---|---|---|---|
| 9,261,589 B2* | 2/2016 | Itoh | G01S 13/345 |
| 9,372,260 B2* | 6/2016 | Kambe | G01S 13/345 |
| 9,588,221 B2* | 3/2017 | Sato | G01S 13/34 |
| 2005/0128197 A1* | 6/2005 | Thrun | G01B 21/20 |
| | | | 345/421 |
| 2009/0121915 A1* | 5/2009 | Randler | G01S 13/345 |
| | | | 342/70 |
| 2010/0214153 A1* | 8/2010 | Kikuchi | G01S 7/2921 |
| | | | 342/70 |
| 2016/0005229 A1* | 1/2016 | Lee | G06F 3/0488 |
| | | | 345/419 |
| 2016/0082912 A1* | 3/2016 | Yoon | B60R 21/01 |
| | | | 701/45 |
| 2016/0357014 A1* | 12/2016 | Beckman | G02B 27/01 |
| 2017/0060234 A1* | 3/2017 | Sung | G06F 3/1431 |
| 2018/0053401 A1* | 2/2018 | Martin | H04L 67/04 |

OTHER PUBLICATIONS

English Translation of FR 2954518 to Pinault (Translated Aug. 14, 2019).*

* cited by examiner

AUTONOMOUS MOVEMENT DEVICE, AUTONOMOUS MOVEMENT METHOD AND PROGRAM RECORDING MEDIUM

BACKGROUND

1. Technical Field

The present invention relates to a technique for creating a map and moving autonomously.

2. Related Art

Autonomous movement devices that autonomously move depending on the use have been widely spread. For example, an autonomous movement device that autonomously moves for indoor cleaning is known. Such an autonomous movement device mainly detects a distance to an object (obstacle) existing in the surroundings using a laser range scanner or the like and creates a map showing where the obstacle exists in the surrounding environment. There are some moving obstacles, and techniques to deal with the moving obstacles have been developed. For example, JP 2010-102485 A discloses an autonomous movement device that moves efficiently by removing a ghost of a moving obstacle (data that remains at a position of the obstacle in the past and appears as if the obstacle is still there) from a map.

SUMMARY

In order to achieve the above object, an autonomous movement device according to an embodiment of the present invention includes:

an obstacle detector that detects an obstacle;

a map creator that creates an environment map and records information about the obstacles on the environment map;

an obstacle canceller that cancels the information about the obstacle recorded by the map creator from the environment map depending on the passage of time; and a router that sets a moving route based on the information recorded on the environment map.

DETAILED DESCRIPTION

Figure 1:
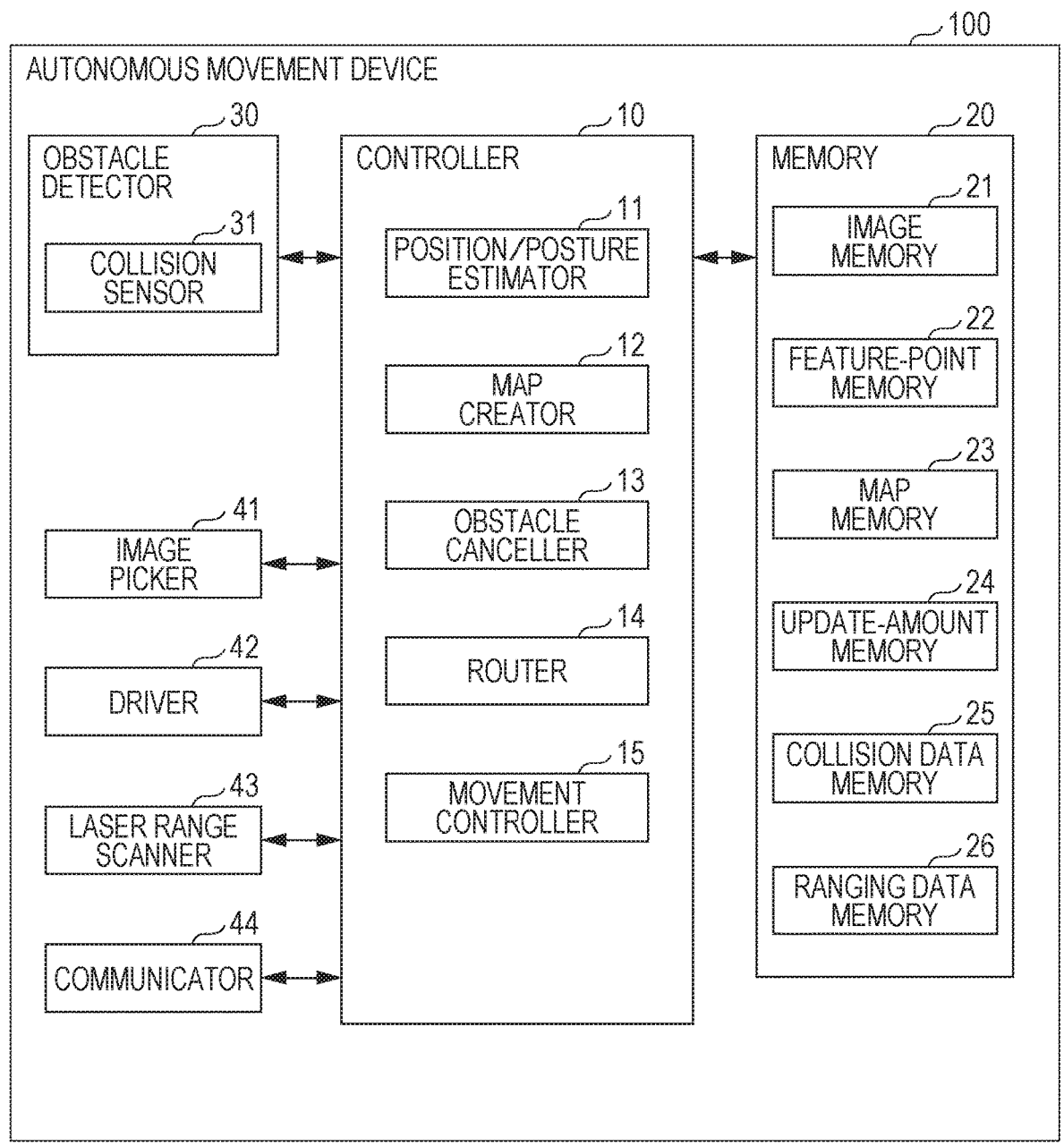
FIG. 1 is a diagram showing a functional configuration of an autonomous movement device according to a first embodiment of the present invention.

Embodiments of the present invention are described below with reference to the drawings. In the drawings, the same or equivalent elements are denoted by the same reference signs.

(First Embodiment)

An autonomous movement device according to an embodiment of the present invention is a device that autonomously moves depending on the use while creating a surrounding map. The use is, for example, for security monitoring, indoor cleaning, pets, toys, or the like.

As shown in FIG. 1, an autonomous movement device 100 according to a first embodiment of the present invention includes a controller 10, a memory 20, an obstacle detector 30, an image picker 41, a driver 42, a laser range scanner 43, and a communicator 44.

The controller 10 is constituted by a central processing unit (CPU) and the like, and executes programs stored in the memory 20 to implement the functions of components (a position/posture estimator 11, a map creator 12, an obstacle canceller 13, a router 14, and a movement controller 15) to be described later. In addition, the controller 10 includes a timer (not shown) to count elapsed time.

The memory 20 is constituted by a read only memory (ROM), a random access memory (RAM), and the like, and functionally includes an image memory 21, a feature-point memory 22, a map memory 23, an update-amount memory 24, a collision data memory 25, and a ranging data memory 26. The ROM stores programs executed by the CPU of the controller 10 and data necessary in advance for executing the programs. The RAM stores data to be created or changed during the programs are executed.

The image memory 21 stores images photographed up by the image picker 41. However, in order to save memory capacity, the image memory 21 may not store all photographed images. The autonomous movement device 100 estimates its own position (self position and orientation) by simultaneous localization and mapping (SLAM) processing using a plurality of images stored in the image memory 21. The information of the images used for the estimation of its own position is stored together with the information about its own positions when the images are photographed.

The feature-point memory 22 stores, among the feature points included in the images stored in the image memory 21, the three-dimensional position (X, Y, Z) of a feature point in the real space as long as the three-dimensional position is obtained and the feature value of the feature point in association with each other. A feature point is a characteristic portion in an image such as a corner portion in the image and can be acquired using an algorithm such as the scale-invariant feature transform (SIFT) or speeded up robust features (SURF). The feature value of the feature point is a feature value obtained by, for example, SIFT or the like. In the above SLAM processing, since the self position is estimated based on the three-dimensional position of the feature point stored in the feature-point memory 22, it can be considered that the feature-point memory 22 stores map information for the SLAM.

The map memory 23 stores an environment map created by the map creator 12 based on the information from the obstacle detector 30 (a collision-sensor map to be described later) and an environment map created by the map creator 12 based on the information from the laser range scanner 43 (a laser-range-scanner map to be described later). The environment map is an occupancy grid map in which a floor surface is divided in, for example, a 5 cm×5 cm grid, and the existence probability of an obstacle at the position corresponding to each grid point (the region having the same shape as that of the grid setting a grid point as the center) is indicated as the value of the grid point. Instead of "a position corresponding to each grid point", "a position corresponding to each grid (a region of the grid)" may be used. Note that, since the value of each grid point on the occupancy grid map becomes greater as the possibility that an obstacle exists at the position is higher, and becomes smaller as the possibility that an obstacle does not exist at the position is higher, the term "existence probability" is used for convenience, and a strict existence probability is not required. The value of the existence probability to be recorded as the value of each grid point on the occupancy grid map may be the value of an existence probability P (a real number from 0 to 1) itself, but the logarithm odds L (integers) are used in the present embodiment. The relationship between P and L can be expressed by the following Expression (1), when k is a positive constant.

$$P=1-1/(1+\exp(kL)) \quad (1)$$

As shown in Expression (1), L=0 is satisfied when P=0.5, L=−∞ is satisfied when P=0, and L=∞ is satisfied when P=1, and integer values are used for the probability by using the logarithm odds. The existence of an obstacle at the position corresponding to a grid point can be indicated based on whether the value L of each grid point is larger or smaller than the reference value. In the present embodiment, it is assumed that the minimum value (Lmin) is set to −127, the maximum value (Lmax) is set to 127 as the value of L, and that the initial value of the value of each grid point on the occupancy grid map is set to L=0. Then, it is assumed that if, for example, L is greater than an existence reference value (for example, 10), an obstacle exists at the grid point, that if L is less than a nonexistence reference value (for example, −10), no obstacle exists at the grid point, and that if L is equal to or greater than the nonexistence reference value and less than the existence reference value, the existence of an obstacle at the grid point is unknown. However, these values can be arbitrarily changed.

The update-amount memory 24 stores the update amount for each map (the amount for updating the value of each grid point) stored in the map memory 23. As the update amount for a laser-range-scanner map, a value Δr (for example, 5) common to all the grid points is stored. As the update amount for a collision-sensor map, an update amount Δc (for example, 10 as the initial value) of the value of each grid point on the collision-sensor map is stored. The update amount Δc can be considered as the speed for cancelling obstacle information from the collision-sensor map (cancelling speed).

The collision data memory 25 stores data (collision data) indicating the position of a colliding object (obstacle) obtained based on the self position and orientation of the autonomous movement device 100 when a collision sensor 31 to be described later detects a collision and the position of the collision sensor 31, which has detected the collision, in the autonomous movement device 100.

The ranging data memory 26 stores ranging data indicating the distance to an object detected by the laser range scanner 43 together with information about the angle at which the object has been detected.

Figure 2:
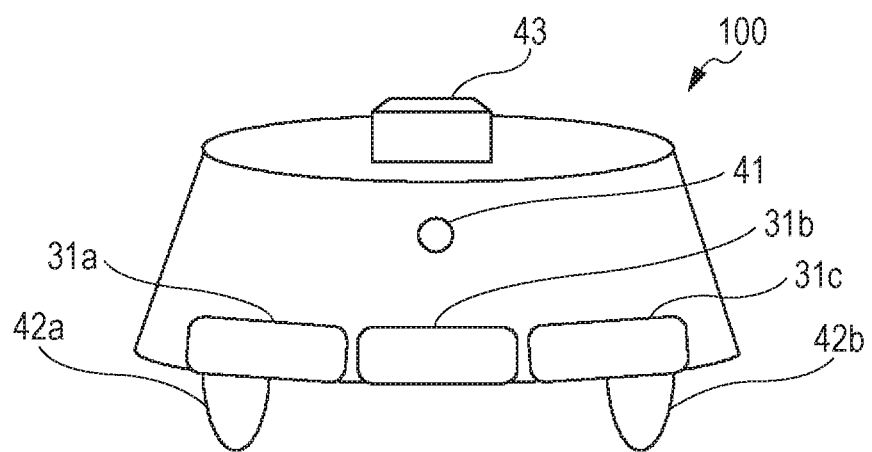
FIG. 2 is a diagram showing an appearance of the autonomous movement device according to the first embodiment.

The obstacle detector 30 includes a sensor that detects an obstacle by approaching the obstacle by the autonomous movement device 100. The obstacle is used as a generic name of places where the autonomous movement device 100 cannot move, and includes a wall, an object, a hole, a cliff, or the like. In the first embodiment, the obstacle detector 30 includes a collision sensor 31 that detects a collision with an obstacle to detect the obstacle. Although the number of the collision sensors 31 is arbitrary, the autonomous movement device 100 includes, as the collision sensor 31, a collision sensor 31b provided at the front of the autonomous movement device 100, a collision sensor 31a provided slightly to the right of the front, and a collision sensor 31c provided slightly to the left of the front as shown in FIG. 2. When an object collides with these collision sensors 31, the collided collision sensor 31 notifies the controller 10 that the collision has been detected. Then, the controller 10 registers, in the collision data memory 25, the collision data indicating the position of the colliding object based on the self position and orientation of the autonomous movement device 100 at that time and the position of the collision sensor 31, which has notified of the collision detection, in the autonomous movement device 100.

The image picker 41 includes a monocular imaging device (camera) as shown in FIG. 2. The image picker 41 acquires images (frames) at, for example, 30 frames per second (fps). The autonomous movement device 100 autonomously moves while recognizing the self position and the surrounding environment in real time by the SLAM processing based on the images sequentially acquired by the image picker 41.

The driver 42 is a moving means that is an independent two-wheel drive type and includes a wheel and a motor. In FIG. 2, the right wheel is shown as a driver 42a and the left wheel is shown as a driver 42b. The autonomous movement device 100 is capable of parallel movement (translation movement) in the back-and forth direction by driving the two wheels in the same direction, of rotating at its position (orientation change) by driving the two wheels in opposite directions, and of turning (translation movement+rotation (orientation change) movement) by driving the two wheels at different speeds. Each wheel is provided with a rotary encoder that measures the number of rotations of the wheel to calculate a translation movement amount and a rotation amount by utilizing the geometric relationship such as the diameter of the wheel and the distance between the wheels.

When, for example, the diameter of the wheel is D and the number of rotations is R (measured by the rotary encoder), the translation movement amount of the wheel at the contact portion is expressed by $\pi \times D \times R$. In addition, when the diameter of the wheel is D, the distance between the wheels is I, the number of rotations of the right wheel is RR, and the number of rotations of the left wheel is RL, the rotation amount for the orientation change is expressed by $360° \times D \times (RL-RR)/(2 \times I)$. By sequentially adding the translation movement amount and the rotation amount, the driver 42 functions as a so-called odometry and is used to estimate its own position (self position and orientation based on the self position and orientation at the start of the movement). Here, the "orientation" of the device is also referred to as a "posture" of the device.

Note that, crawlers may be provided instead of the wheels, or a plurality of (for example, two) legs may be provided to move by walking with the legs. In these cases, it is possible to estimate the self position and orientation (posture) based on the movement of the two crawlers and the movement of the legs similarly to the case of the wheels.

Figure 3A:
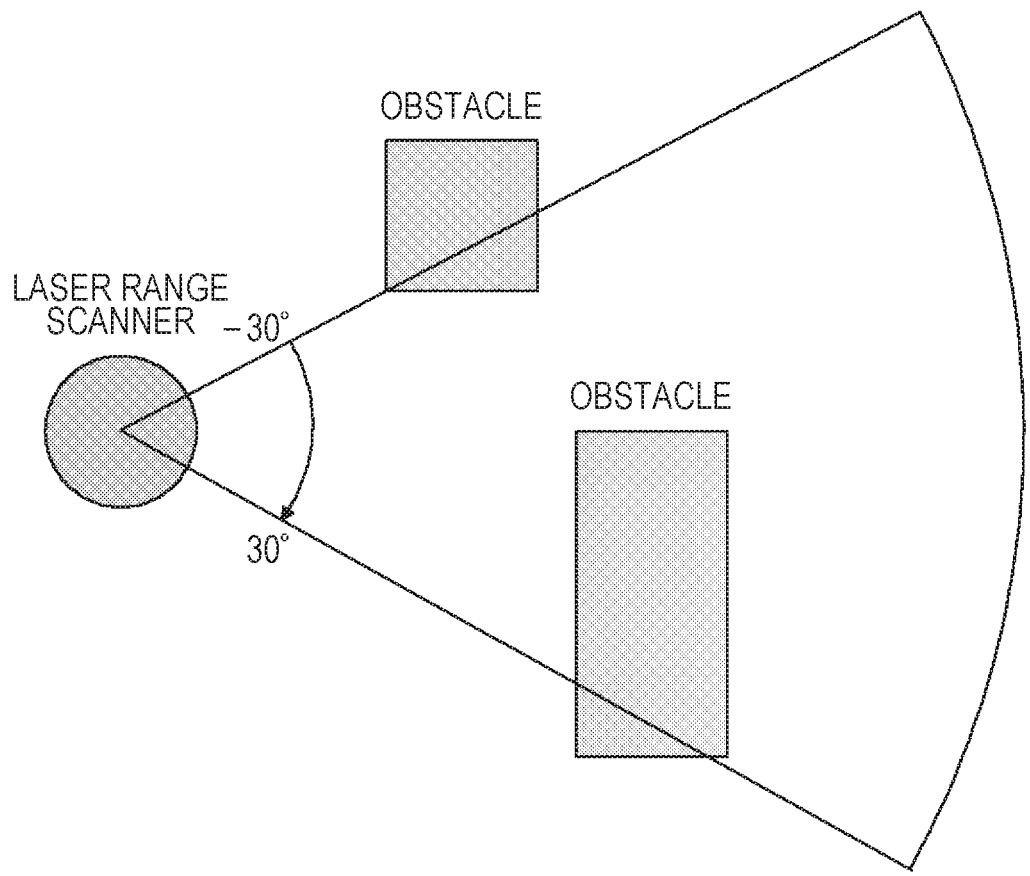
FIG. 3A is a diagram showing an example of scanning by a laser range scanner.
Figure 3B:
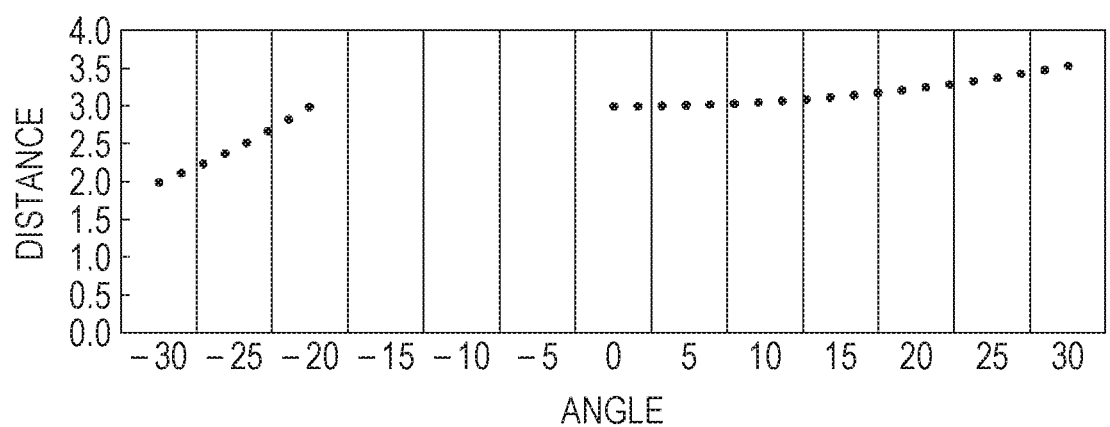
FIG. 3B is a diagram showing an example of ranging data obtained by the laser range scanner.

The laser range scanner 43 detects an object (obstacle) existing in the surroundings and acquires the distance (ranging data) to the object. The laser range scanner 43 is constituted by, for example, a two-dimensional laser scanner provided at the upper portion of the autonomous movement device 100 as shown in FIG. 2, detects a non-close object from a distance, and acquires the distance to the object. As shown in FIG. 3A, the laser range scanner 43 scans a predetermined angle range (for example, a range from $-30°$ to $+30°$) with a laser beam to acquire the distance (ranging data) to an object existing in the surrounding angle range for each predetermined angle (for example, $1°$). If there is no object in that direction, no ranging data for the angle is acquired. For example, when the laser range scanner 43 performs the scanning shown in FIG. 3A, the ranging data shown in FIG. 3B can be acquired. When observing (scanning) the surroundings periodically (for example, at a frequency of 30 times per second) and detecting an object, the laser range scanner 43 transmits, to the controller 10, the ranging data indicating the distance to the object and the angle information at which the object has been detected. Then, the controller 10 registers these pieces of information (the distance to the object and the angle at which the object has been detected) in the ranging data memory 26.

The communicator 44 is a module for communicating with an external device and is a wireless module including an antenna when wireless communication with an external device is performed. For example, the communicator 44 is a wireless module for performing short-range wireless communication based on the Bluetooth (registered trademark). With the communicator 44, the autonomous movement device 100 can exchange data with the outside. For example, when a user instructs the autonomous movement device 100 of a destination, the destination information may be transmitted via the communicator 44.

Next, the functions of the controller 10 are described. The controller 10 includes a position/posture estimator 11, a map creator 12, an obstacle canceller 13, a router 14, and a movement controller 15, and creates an environment map and controls movement of the autonomous movement device 100. In addition, the controller 10 can deal with a multi-thread function, and execute a plurality of threads (different processing flows) in parallel.

The position/posture estimator 11 estimates the self position and posture of the autonomous movement device 100 by the SLAM processing using a plurality of images photographed by the image picker 41 and stored in the image memory 21. In estimating the self position and posture, the position/posture estimator 11 can also use odometry information that can be acquired from the driver 42.

The map creator 12 creates an environment map that records the position of an obstacle (object) using the information from the collision sensor 31 and the laser range scanner 43, and stores the map in the map memory 23. As described above, the environment map is an occupancy grid map in which a plane is divided into grid points and numerical values indicating the existence probabilities of objects (obstacles) detected by the collision sensor 31 and the laser range scanner 43 are recorded at each grid point. The map creator 12 creates a separate occupancy grid map for each sensor that detects an obstacle. Thus, in order to distinguish these maps, the occupancy grid map created by the map creator 12 based on the information from the collision sensor 31 is referred to as a collision-sensor map, and the occupancy grid map created by the map creator 12 based on the information from the laser range scanner 43 is referred to as a laser-range-scanner map.

For example, the map creator 12 records, based on the information from the collision sensor 31, the existence of an obstacle at the grid point corresponding to the colliding position on the collision-sensor map. The map creator 12 further records, based on the information from the laser range scanner 43, the existence of an obstacle at each grid point detected by the laser range scanner 43 on the laser-range-scanner map.

The obstacle canceller 13 cancels the information about the obstacle recorded by the map creator 12 on the environment map (collision-sensor map) from the environment map (collision-sensor map) depending on the passage of time. This cancellation is performed in processing for updating the collision-sensor map, which will be described later, and details will be described later.

The router 14 sets a moving route to the destination based on the information of the environment map stored in the map memory 23.

The movement controller 15 controls the driver 42 so as to move the device along the moving route set by the router 14.

Figure 4:
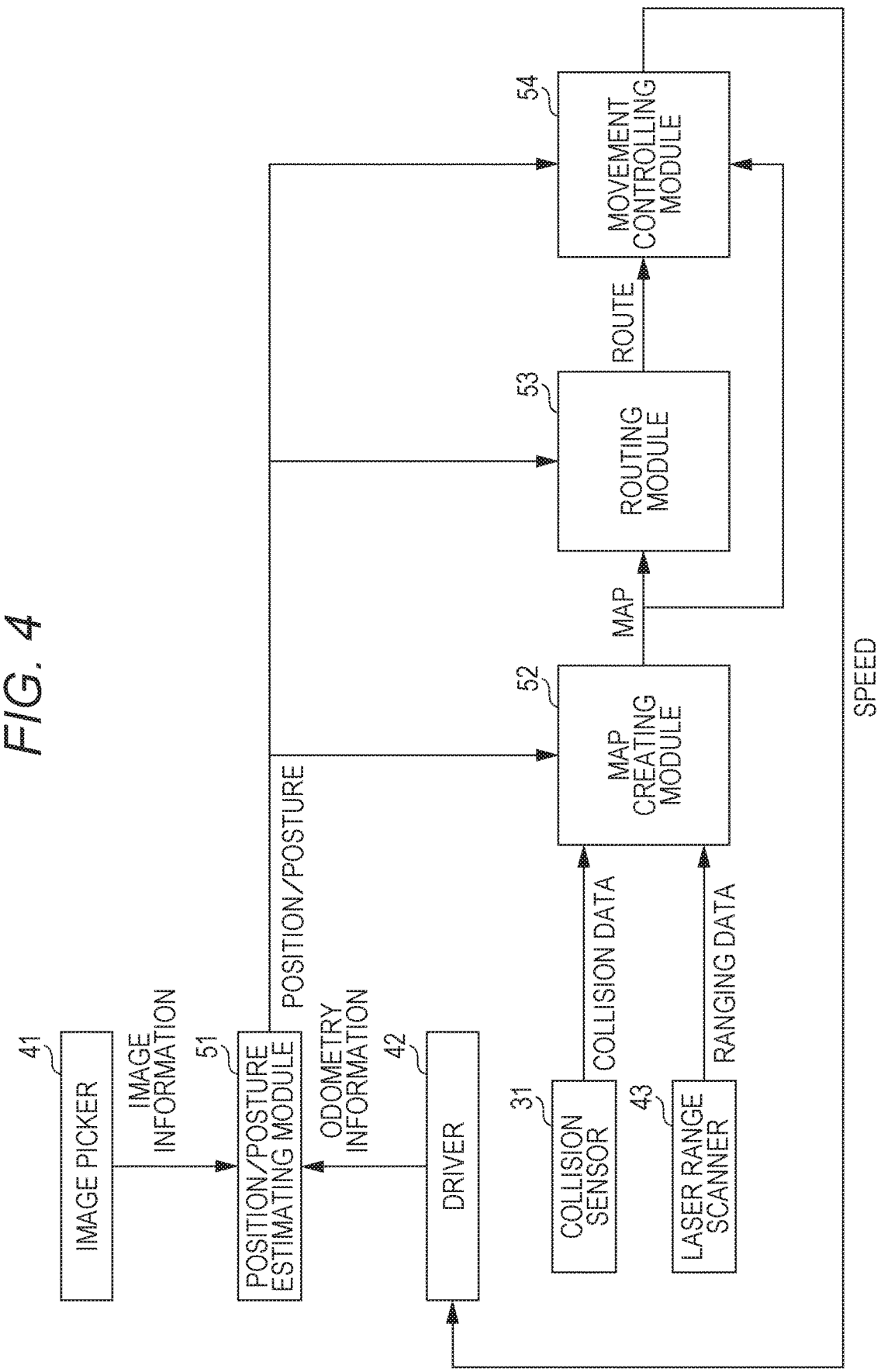
FIG. 4 is a diagram showing an overall configuration of a software module of the autonomous movement device according to the first embodiment.

The functional configuration of the autonomous movement device 100 has been described above. Next, the overall configuration of the software module executed by the controller 10 of the autonomous movement device 100 is described with reference to FIG. 4. In FIG. 4, a position/posture estimating module 51 corresponds to the position/posture estimator 11 described in the above functional configuration, a map creating module 52 corresponds to the map creator 12, a routing module 53 corresponds to the router 14, and a movement controlling module 54 corresponds to the movement controller 15.

When the autonomous movement device 100 is powered on, these software modules are activated as separate threads and start execution in parallel. The position/posture estimating module 51 performs the SLAM processing using the image information acquired from the image picker 41 and estimates the self position and posture using the odometry information acquired from the driver 42. The map creating module 52 creates an environment map based on the self position and posture estimated by the position/posture estimating module 51, the collision data acquired from the collision sensor 31, and the ranging data acquired from the laser range scanner 43.

The routing module 53 sets a route based on the self position and posture estimated by the position/posture estimating module 51 and the environment map created by the map creating module 52. The movement controlling module 54 generates movement control information (mainly speed information) for controlling the driver 42 based on the self position and posture estimated by the position/posture estimating module 51, the environment map created by the map creating module 52, and the route set by the routing module 53. Then, the driver 42 is driven based on the movement control information generated by the movement controlling module 54 to the destination.

Figure 5:
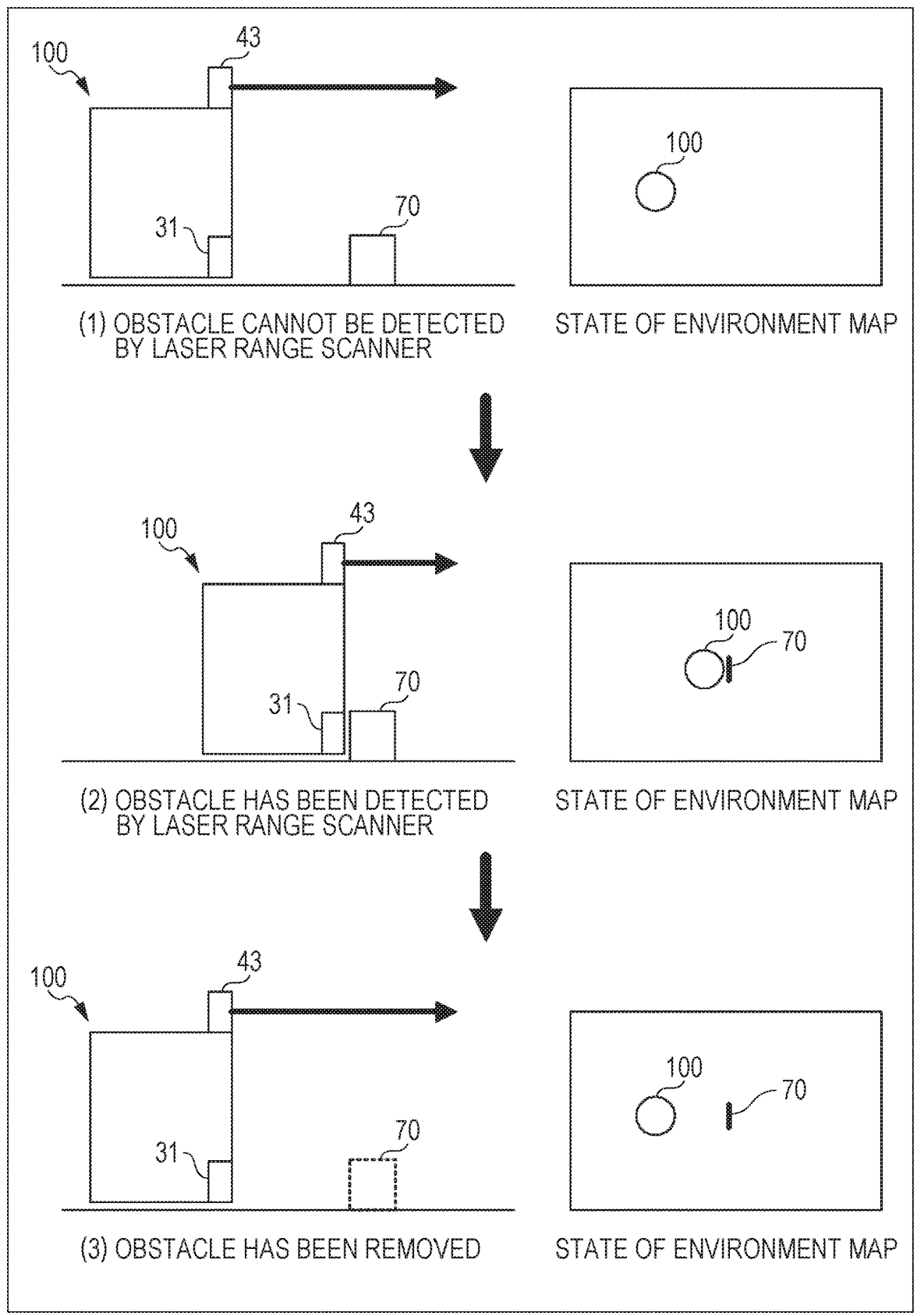
FIG. 5 is a diagram for explaining a problem to be solved by the autonomous movement device according to the first embodiment.

Here, the problem to be solved by the autonomous movement device 100 is described with reference to FIG. 5. The autonomous movement device 100 cannot detect an obstacle 70 with the laser range scanner 43 when the obstacle 70 is small as shown in (1) of FIG. 5, and the obstacle 70 is not recorded on the environment map. When the autonomous movement device 100 moves forward and collides with the obstacle 70 as shown in (2) of FIG. 5, the obstacle 70 is detected by the collision sensor 31 and recorded on the environment map by the collision sensor 31 (collision-sensor map). Then, when the autonomous movement device 100 continues to move while avoiding the obstacle 70 in spite of the fact that the obstacle 70 has been removed, the autonomous movement device 100 cannot detect the removal of the obstacle 70, and the obstacles 70 remains on the environment map (collision-sensor map) as shown in (3) of FIG. 5.

Now, the mechanism for the autonomous movement device 100 to cancel the obstacle 70 in (3) of FIG. 5 from the environment map (collision-sensor map) is described below. First, the processing of the map creating module 52 is described with reference to FIG. 6. In the following description, it is assumed that the laser-range-scanner map is represented by a two-dimensional array variable MA [i, j], the collision-sensor map is represented by a two-dimensional array variable MB [i, j], the environment map in which the laser-range-scanner map and the collision-sensor map are integrated is represented by a two-dimensional array variable MI [i, j], and an update amount for the collision-sensor map is represented by a two-dimensional array variable DC [i, j]. Here, when xsize is the coordinate of the maximum grid point in the X direction of the environment map and ysize is the coordinate of the maximum grid point in the Y direction of the environment map, $0 \leq i \leq xsize$, $0 \leq j \leq ysize$ is satisfied.

First, the map creator 12 initializes the laser-range-scanner map stored in the map memory 23 (step S101). The map is initialized by setting the values of all grid points on the occupancy grid map to 0. Specifically, MA [i, j]=0 is executed for all "i" and "j" in $0 \leq i \leq xsize$, $0 \leq j \leq ysize$.

Next, the map creator 12 initializes the collision-sensor map stored in the map memory 23 (step S102). More specifically, MB [i, j]=0 is executed for all "i" and "j" in $0 \leq i \leq xsize$, $0 \leq j \leq ysize$.

Next, the obstacle canceller 13 initializes the update amount Δc for the collision-sensor map stored in the update-amount memory 24 (step S103). The initial value at this time is arbitrary, but is set to 10, for example. As specific processing, DC [i, j]=10 is executed for all "i" and "j" in $0 \leq i \leq xsize$, $0 \leq j \leq ysize$.

Next, the controller 10 determines whether the autonomous movement device 100 terminates the operation (step S104). When the user powers off the autonomous movement device 100 or when the remaining quantity of the battery is less than a predetermined quantity (for example, remaining 3% or the like), the autonomous movement device 100 terminates the operation. When the autonomous movement device 100 terminates the operation (step S104; Yes), the processing is terminated. When the autonomous movement device 100 does not terminate the operation (step S104; No), the map creator 12 acquires the self position and posture estimated by the position/posture estimator 11 at that time (step S105).

Next, the map creator 12 performs processing for updating the laser-range-scanner map (step S106). Details of the processing for updating the laser-range-scanner map are described later. Then, the map creator 12 performs processing for updating the collision-sensor map (step S107). Details of the processing for updating the collision-sensor map are described later. Next, the map creator 12 creates an environment map in which the laser-range-scanner map and the collision-sensor map are integrated (step S108), and the processing returns to the step S104.

The environment map in which the laser-range-scanner map and the collision-sensor map are integrated is a map for enabling the autonomous movement device 100 to recognize information which is recorded only on one of the laser-range-scanner map and the collision-sensor map. Specifically, the following processing is performed for all "i" and "j" in $0 \leq i \leq xsize$, $0 \leq j \leq ysize$.

(1) If MA [i, j]<0 and MB [i, j]<0, MI [i, j]=min (MA [i, j], MB [i, j]) is to be satisfied.

(2) If MA [i, j]>0 or MB [i, j]>0, MI [i, j]=max (MA [i, j], MB [i, j]) is to be satisfied.

Figure 6:
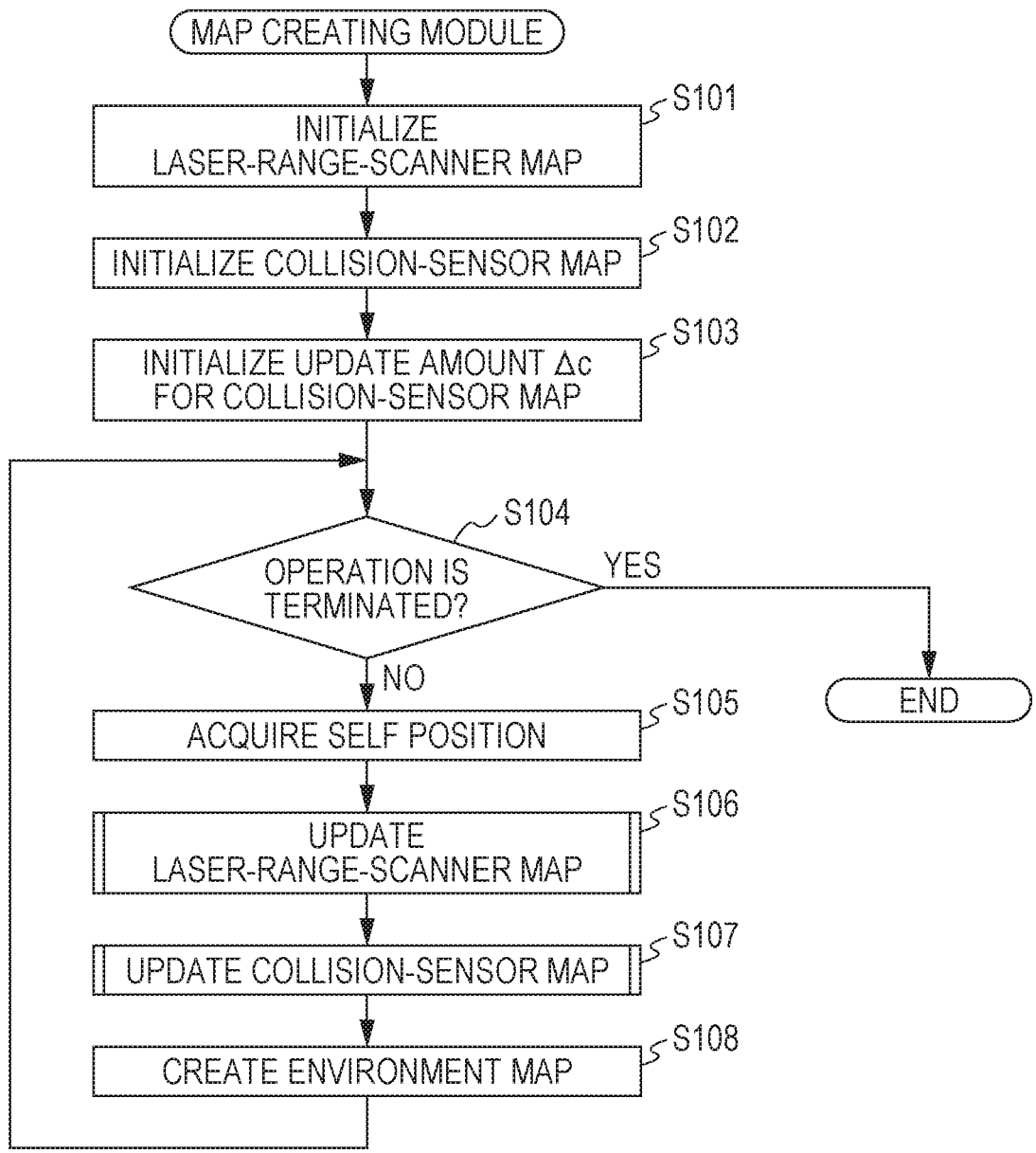
FIG. 6 is a flowchart of a map creating module according to the first embodiment.
Figure 7:
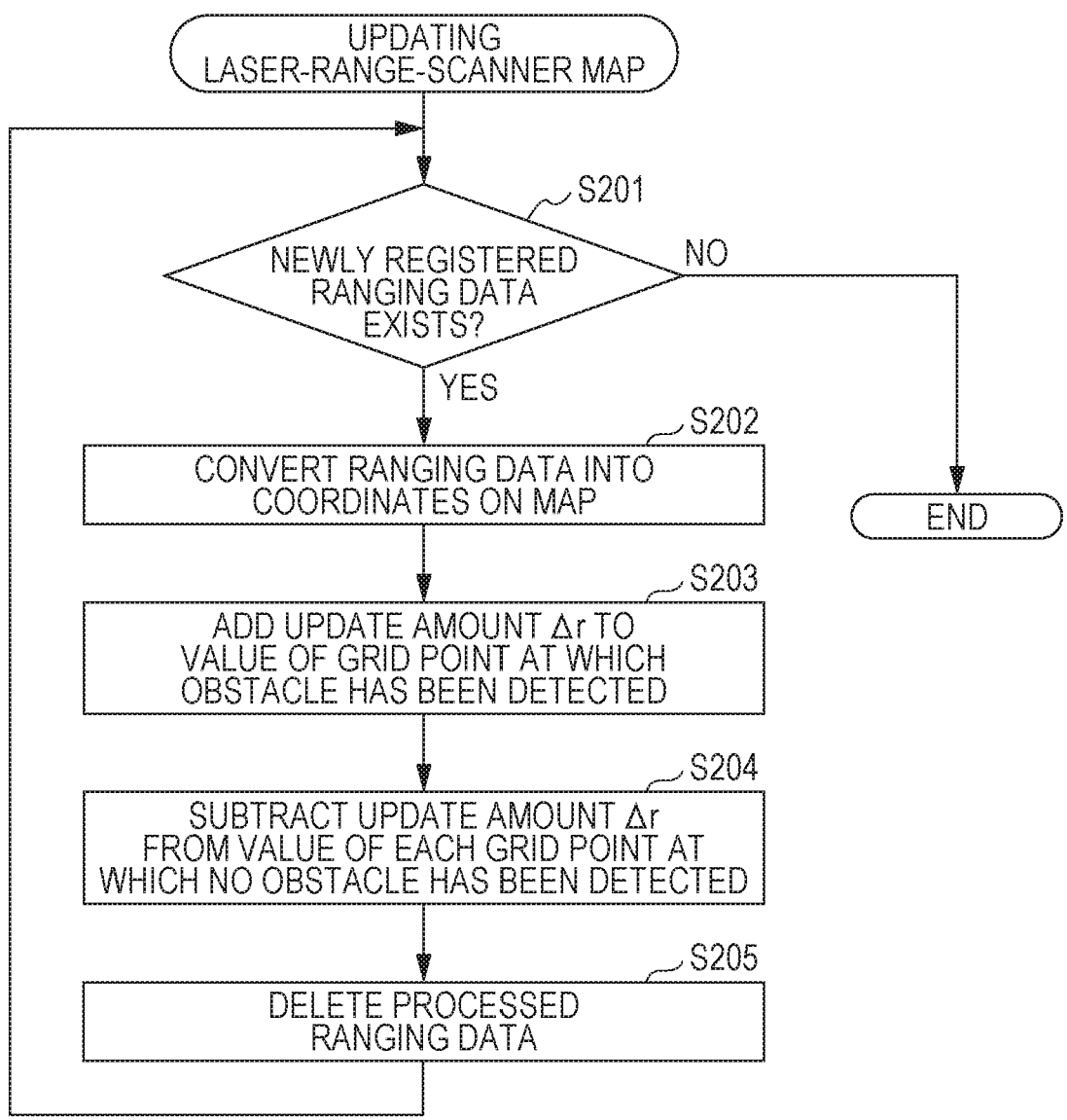
FIG. 7 is a flowchart of processing for updating a laser-range-scanner map according to the first embodiment.

Next, the processing for updating the laser-range-scanner map performed in step S106 in FIG. 6 is described with reference to FIG. 7. First, the map creator 12 determines whether ranging data newly registered in the ranging data memory 26 exists (step S201). When no ranging data newly registered in the ranging data memory 26 exists (step S201; No), the processing for updating the laser-range-scanner map is terminated.

When ranging data newly registered in the ranging data memory 26 exists (step S201; Yes), the map creator 12 acquires the ranging data from the ranging data memory 26 and converts the ranging data into the coordinates on the laser-range-scanner map using the self position and posture acquired in step S105 in FIG. 6 (step S202). The coordinates indicate the grid point (region) at which an obstacle has been detected by the laser range scanner 43 on the laser-range-scanner map, and the map creator 12 functions, in this step, as an obstacle position acquirer that acquires the position of the obstacle from a distance. Here, it is assumed that, for example, an obstacle has been detected at the coordinates of [m, n] on the laser-range-scanner map.

Then, the map creator 12 adds the update amount Δr to the value of the grid point at which the obstacle has been detected (step S203). Specifically, MA [m, n]=MA [m, n]+Δr is executed. However, when MA [m, n] exceeds the maximum value Lmax at this time, MA [m, n]=Lmax is to be satisfied.

Next, the map creator 12 subtracts the update amount Δr from the value of each grid point at which no obstacle has been detected within the observation (scanning) range of the laser range scanner 43 (step S204). Specifically, MA [i, j]=MA [i, j]−Δr is executed for all [i, j] before [m, n] in the direction in which the obstacle has been detected and for all [i, j] within the observation range of the laser range scanner 43 in the direction in which no obstacle has been detected. However, when MA [i, j] is less than the minimum value Lmin at this time, MA [i, j]=Lmin is to be satisfied.

Then, the map creator 12 deletes, from the ranging data memory 26, the ranging data acquired in step S202 (step S205), and the processing returns to step S201. The laser-range-scanner map is updated by the above processing for updating the laser-range-scanner map, and the existence probability of the obstacle is indicated by the value of each grid point on the laser-range-scanner map.

Note that, as the value of each grid point on the laser-range-scanner map, by recording a pair of the number of observations (the number of times the laser range scanner 43 has observed (scanned) the grid point) and the number of detections (the number of times the laser range scanner 43 has detected that the obstacle exists at the position of the grid point) instead of the logarithm odds L, the existence probability of the obstacle at each grid point may be defined as the ratio of the number of detections to the number of observations.

Figure 8:
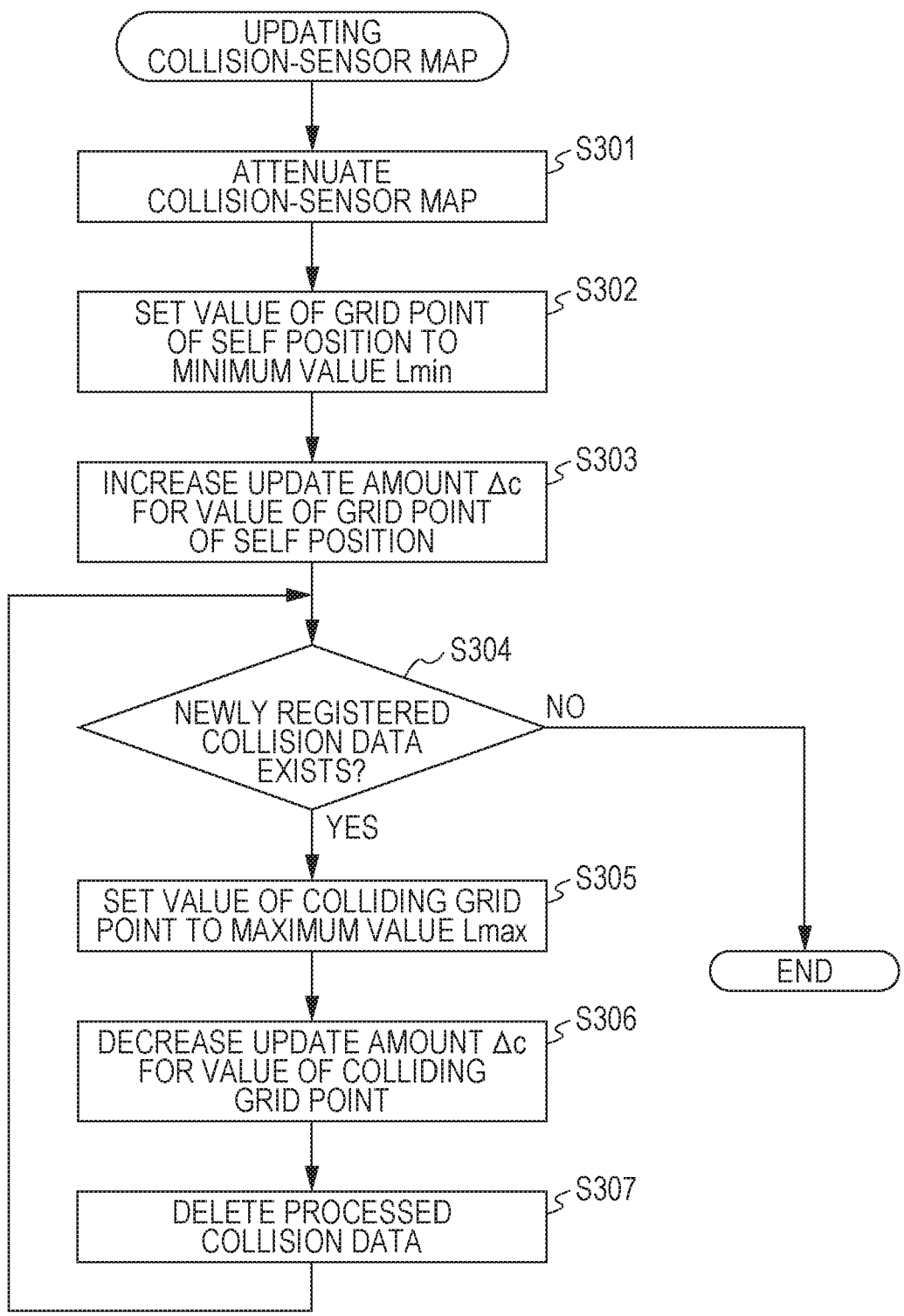
FIG. 8 is a flowchart of processing for updating a collision-sensor map according to the first embodiment.

Next, the processing for updating the collision-sensor map performed in step S107 in FIG. 6 is described with reference to FIG. 8. First, the obstacle canceller 13 attenuates the value of each grid point on the collision-sensor map (step S301). Step S301 is also referred to as an obstacle cancelling step. In this step, specifically, the obstacle canceller 13 performs the following processing for all "i" and "j".

(1) If MB [i, j]>0, MB [i, j]=MB [i, j]−DC [i, j] is to be satisfied.

(2) If MB [i, j]<0, MB [i, j]=MB [i, j]+DC [i, j] is to be satisfied.

Then, the map creator 12 sets the value of the grid point on the collision-sensor map corresponding to the self position acquired in step S105 in FIG. 6 to the minimum value Lmin (step S302). Specifically, when the coordinates of the self position are [p, q], MB [p, q]=Lmin is executed. Then, the obstacle canceller 13 increases the update amount Δc for the value of the grid point on the collision-sensor map corresponding to the self position by a reference-non-obstacle adjusting value (for example, 5) (step S303). Specifically, when the coordinates of the self position are [p, q], DC [p, q]=DC [p, q]+5 is executed. Here, if DC [p, q] exceeds Lmax, DC [p, q]=Lmax is to be satisfied.

Next, the map creator 12 determines whether collision data newly registered in the collision data memory 25 exists (step S304). Step S304 is also referred to as an obstacle detecting step. When no collision data newly registered in the collision data memory 25 exists (step S304; No), the processing for updating the collision-sensor map is terminated.

When collision data newly registered in the collision data memory 25 exists (step S304: Yes), the map creator 12 acquires the collision data (the coordinates indicating the position at which the colliding obstacle exists) from the collision data memory 25 and sets the value of the grid point on the collision-sensor map at which the colliding obstacle exists to the maximum value Lmax (step S305). Specifically, when the coordinates of the colliding obstacle are [v, w], MB [v, w]=Lmax is executed. Step S305 is also referred to as a map creating step. Then, the obstacle canceller 13 decreases the update amount Δc for the value of the grid point at which the colliding obstacle exists by a reference-obstacle adjusting value (for example, 5) (step S306). Specifically, when the coordinates of the colliding obstacle are [v, w], DC [v, w]=DC [v, w]−5 is executed. Here, if DC [p, q] is equal to or less than 0, DC [v, w]=1 is to be satisfied.

Then, the map creator 12 deletes, from the collision data memory 25, the collision data acquired in step S305 (step S307), and the processing returns to step S304. The collision-sensor map is updated by the above processing for updating the collision-sensor map, and the ghost of the obstacle is prevented from remaining by the attenuating processing in step S301. In addition, by increasing or decreasing the value itself of the update amount Δc for the value of each grid point, the attenuating speed is decreased at a grid point at which the possibility that the obstacle exists is high, and the attenuating speed is increased at a grid point at which the possibility of the obstacle exists is low. This decreases the frequency of re-colliding with obstacles that do not move, and also has the effect of increasing the speed for tracking moving obstacles.

Figure 9:
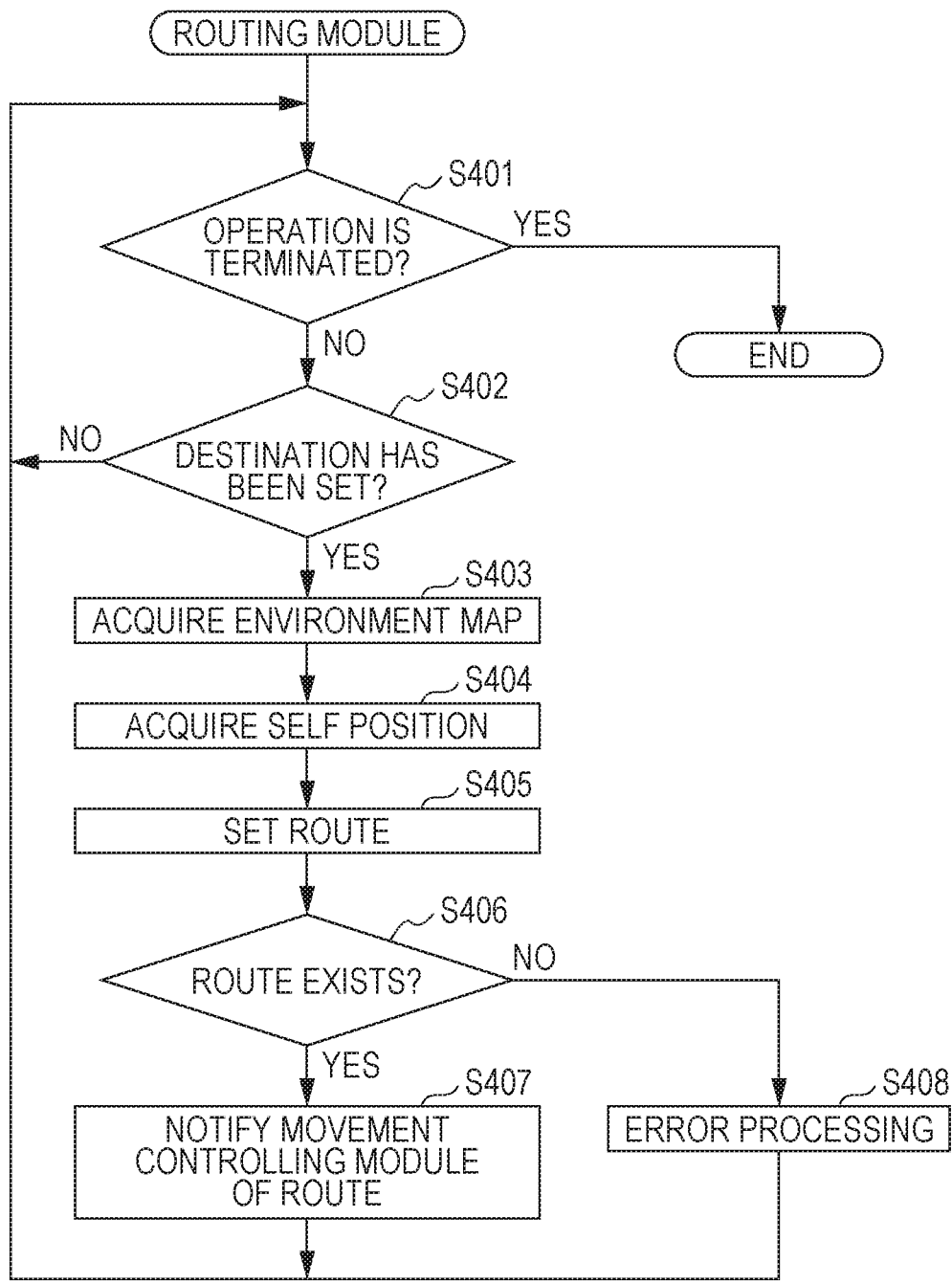
FIG. 9 is a flowchart of a routing module according to the first embodiment.

Next, the processing of the routing module 53 for setting a route to the destination using the map created by the map creating module 52 is described with reference to FIG. 9.

First, the controller 10 determines whether the autonomous movement device 100 terminates the operation (step S401). When the autonomous movement device 100 terminates the operation (step 401; Yes), the processing is terminated. When the autonomous movement device 100 does not terminate the operation (step S401; No), the router 14 determines whether a destination has been set (step S402). The destination is set by the user of the autonomous movement device 100 via the communicator 44, or is autonomously set by the autonomous movement device 100 as needed (for example, when the remaining quantity of the battery is less than a predetermined quantity (for example, 10%), the charging station is set as the destination, or the like).

When the destination has not been set (step S402; No), the processing returns to step S401. When the destination has been set (step S402; Yes), the router 14 acquires the latest environment map created by the map creator 12 at that time (step S403). The environment map is an environment map in which the laser-range-scanner map and the collision-sensor map are integrated (a map represented by a two-dimensional array variable MI [i, j]). Next, the router 14 acquires the current self position and posture estimated by the position/posture estimator 11 (step S404). Then, the router 14 sets a route from the current position to the destination based on the acquired environment map, self position, and posture and the set destination (step S405). Step S405 is also referred to as a route setting step.

Then, the router 14 determines whether a route has been set (whether a route exists) (step S406). When no route exists (step S406; No), the router 14 performs error processing such as notifying the user of the fact (step S408), and the processing returns to step S401. When a route exists (step S406; Yes), the router 14 notifies the movement controlling module 54 of the set route (step S407), and the processing returns to step S401.

Figure 10:
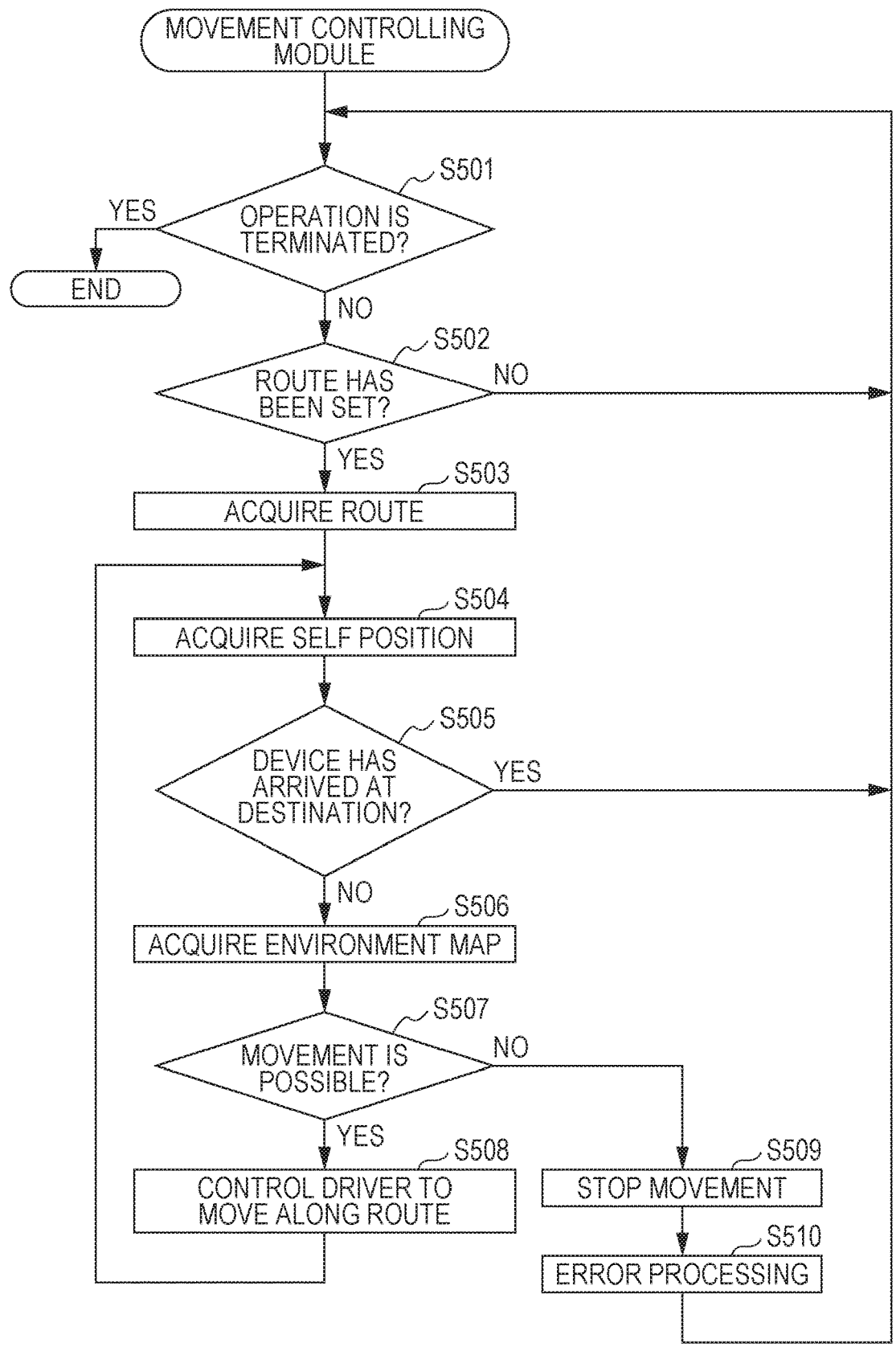
FIG. 10 is a flowchart of a movement controlling module according to the first embodiment.

By the above processing of the routing module 53, the route to the destination is obtained. Next, processing of the movement controlling module 54 for controlling movement to the destination using the route is described with reference to FIG. 10.

First, the controller 10 determines whether the autonomous movement device 100 terminates the operation (step S501). When the autonomous movement device 100 terminates the operation (step S501; Yes), the processing is terminated. When the autonomous movement device 100 does not terminate the operation (step S501; No), the movement controller 15 determines whether the route has been set by the routing module 53 (whether the route set by the routing module 53 has been notified) (step S502). When the route has not been notified (step S502; No), it means that the route has not been set, and the processing returns to step S501.

If the route has been notified (step S502; Yes), it means that the route has been set, and the movement controller 15 acquires the route set by the routing module 53 (step S503). Next, the movement controller 15 acquires the current self position and posture estimated by the position/posture estimator 11 (step S504). Then, the movement controller 15 determines whether the device has arrived at the destination (step S505). Since the information about the route also includes the information about the destination, the movement controller 15 determines whether the current position matches the destination included in the route to determine that the device has arrived at the destination.

When the device has arrived at the destination (step S505; Yes), the processing returns to step S501. When the device has not arrived at the destination (step S505; No), the movement controller 15 acquires the latest environment map created by the map creator 12 (step S506). The environment map is an environment map in which the laser-range-scanner map and the collision-sensor map are integrated (a map represented by a two-dimensional array variable MI $[i, j]$). Then, the movement controller 15 determines whether the device can move along the route based on the acquired environment map and route (step S507).

When the device cannot move along the route (step S507; No), the movement controller 15 controls the driver 42 to stop the movement (step S509), and notifies the routing module 53 of the error (step S510), and the processing returns to step S501. When the device can move along the route (step S507; Yes), the movement controller 15 controls the driver 42 to move along the route (step S508), and the processing returns to step S504.

By the above processing of the movement controlling module 54, the autonomous movement device 100 can move to the destination. Then, as described above, the obstacle canceller 13 decreases the existence probability of the obstacle on the collision-sensor map depending on the passage of time. In addition, since the obstacle canceller 13 can set the speed for decreasing the existence probability to a different value for each grid point on the collision-sensor map, it is possible to efficiently decrease the existence probability according to the property of the object. For this reason, the routing module 53 can set, after a certain time has elapsed, a route that does not avoid the place at which the device has collided with an obstacle in the past, and it is possible for the autonomous movement device 100 to prevent unnecessary obstacle-avoiding operation and to move efficiently.

(First Modification)

The increase or decrease in the update amount for the value of each grid point on the collision-sensor map according to the first embodiment can be performed only on the grid points corresponding to the positions on the moving route and the position at which the autonomous movement device 100 has collided. A first modification in which the adjustment frequency of the update amount is to be improved by increasing or decreasing the update amount in the processing for updating the laser range scanner is described.

Figure 11:
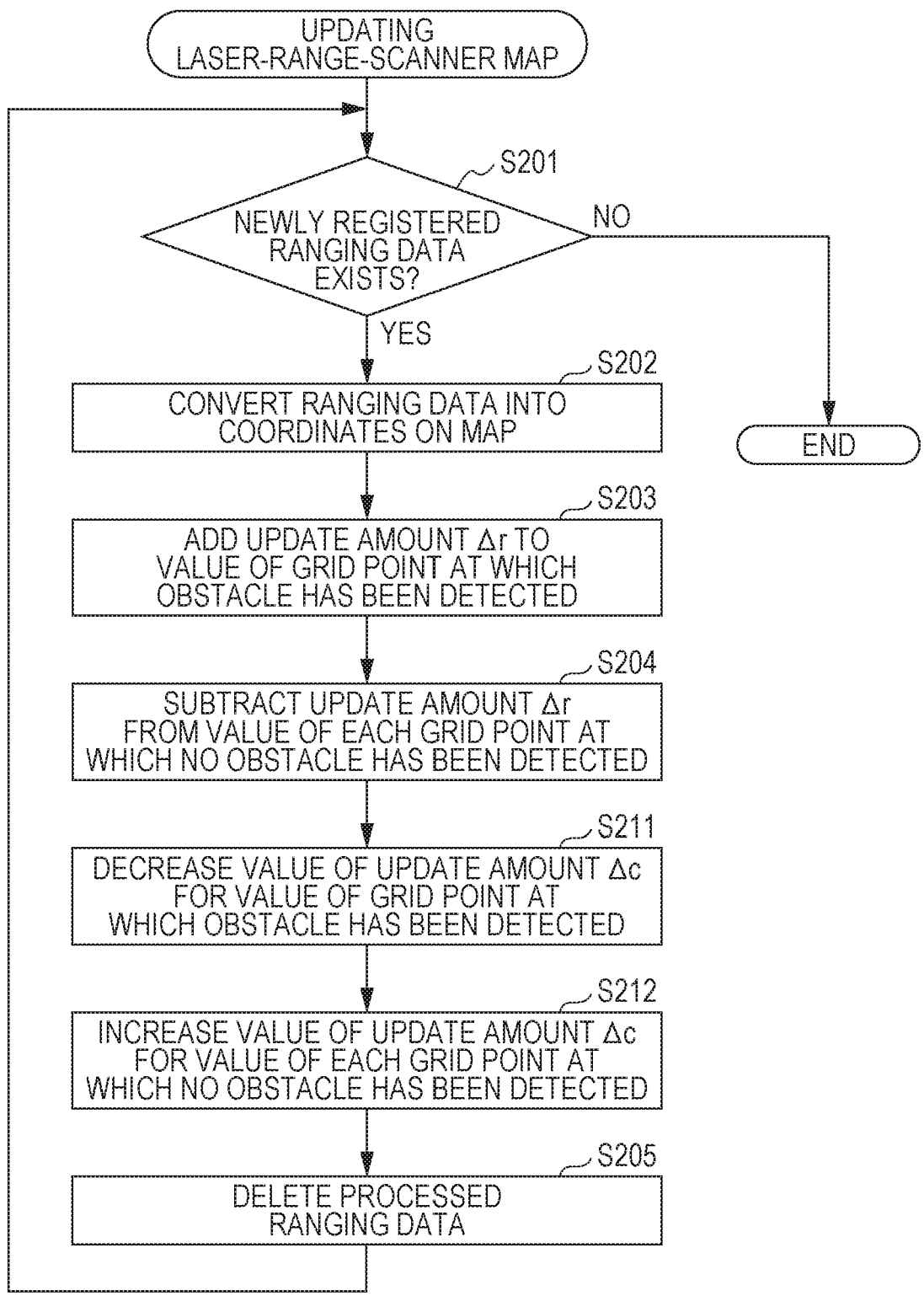
FIG. 11 is a flowchart of processing for updating the laser-range-scanner map according to a first modification of the present invention.

The first modification differs from the first embodiment only in the processing for updating the laser-range-scanner map described with reference to FIG. 7. Thus, the processing for updating the laser-range-scanner map according to first modification is described with reference to FIG. 11. Since the processing from steps S201 to S205 in FIG. 11 is the same as that in FIG. 7, the description thereof is omitted.

In the processing for updating the laser-range-scanner map according to first modification, after step S204, the obstacle canceller 13 decreases the value of the update amount $\Delta c$ for the value of the grid point on the collision-sensor map corresponding to the position of the obstacle detected by the laser range scanner 43 by the reference-obstacle adjusting value (for example, 5) (step S211). Specifically, when the coordinates of the obstacle detected by the laser range scanner 43 are $[m, n]$, DC $[m, n]$=DC $[m, n]$−5 is executed. However, if DC $[m, n]$ is equal to or less than 0 at this time, DC $[m, n]$=0 is to be satisfied. In this case, since it is highly probable that the place of $[m, n]$ is an obstacle that does not move like a wall, and it can be frequently determined whether an obstacle detectable by the laser range scanner 43 exists, if such an obstacle is moved or removed, the change can be immediately reflected in $\Delta c$ (without colliding with the obstacle).

Next, the obstacle canceller 13 increases the value of the update amount $\Delta c$ for the value of the grid point on the collision-sensor map corresponding to the position at which no obstacle has been detected within the observation (scan) range of the laser range scanner 43 by the reference-non-obstacle adjusting value (For example, 5) (step S212). Specifically, when the coordinates of the obstacle detected by the laser range scanner 43 are $[m, n]$, DC $[i, j]$=DC $[i, j]$+5 is executed for all $[i, j]$ before $[m, n]$ in the direction in which the obstacle has been detected and for all $[i, j]$ within the observation range of the laser range scanner 43 in the direction in which the obstacle has not been detected. However, if DC $[i, j]$ exceeds Lmax at this time, DC $[i, j]$=Lmax is to be satisfied.

Then, the processing proceeds to step S205. The subsequent steps are the same as the processing for updating the laser-range-scanner map according to the first embodiment. In the above first modification, it is possible to increase or decrease the update amount $\Delta c$ for the value of each grid point on the collision-sensor map using the obstacle detection situation by the laser range scanner 43. For this reason, when the collision-sensor map is updated, an obstacle that does not move is not cancelled from the collision-sensor map, and the speed for deleting a moving obstacle from the collision-sensor map is further increased. Thus, the autonomous movement device 100 according to the first modification can reflect the movement of the obstacle in the environment map in a short time, and can move more efficiently.

(Second Modification)

In the processing in step S211 in the first modification, the obstacle canceller 13 may set the value of the update amount $\Delta c$ for the value of the grid point on the collision-sensor map corresponding to the position of the obstacle detected by the laser range scanner 43 to an initial value (for example, 10). Specifically, when the coordinates of the obstacle detected by the laser range scanner 43 are $[m, n]$, DC $[m, n]$=10 is executed. If an obstacle suddenly appears at a place at which no obstacle has existed so far, the value of the update amount $\Delta c$ corresponding to the place can be very large. In that case, if the collision-sensor map is attenuated by the processing for updating the collision-sensor map, the information about the obstacle can be cancelled immediately from the collision-sensor map. However, by setting the value of the update amount Δc to the initial value in the processing in step S211 as described above, this problem is solved. Thus, the autonomous movement device 100 according to the second modification can set a route that avoids a suddenly appearing obstacle, and can move more efficiently.

(Third Modification)

Furthermore, the processing in first modification and the processing in the second modification can be combined. For example, a reset reference value (for example, 100) for determining whether to reset Δc is set. Then, in step S211, the obstacle canceller 13 may reset the value of the update amount Δc to the initial value (for example, 10) when the value of the update amount Δc for the value of the grid point on the collision-sensor map corresponding to the position of the obstacle detected by the laser range scanner 43 exceeds the reset reference value, or may decrease the value of the update amount Δc by the reference-obstacle adjusting value when the value of the update amount Δc is less than the reset reference value. By this processing, the autonomous movement device 100 according to the third modification can properly reflect the movement and the sudden appearance of the obstacle in the environment map, and can move more efficiently.

(Second Embodiment)

As a sensor that detects an obstacle by approaching the obstacle, a cliff sensor can be used in addition to a collision sensor. The cliff sensor is a sensor that detects whether a floor surface exists in the surroundings to detect cliffs (holes, cliffs, and the like) that are places where no floor surface exists. By providing the cliff sensor, an autonomous movement device can prevent falling from a stand such as a table. A second embodiment in which the autonomous movement device is provided with the cliff sensor is described.

Figure 12:
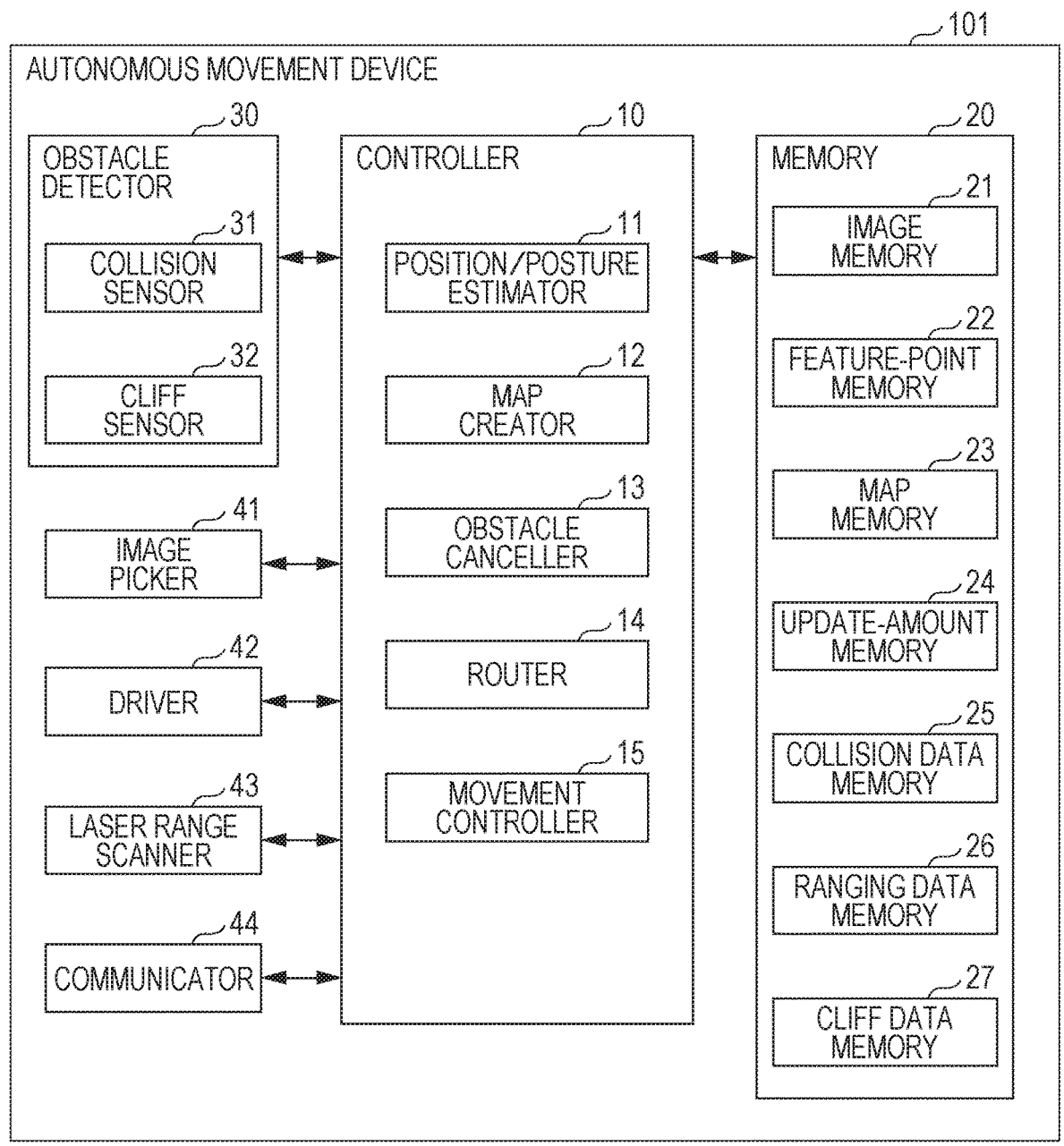
FIG. 12 is a diagram showing a functional configuration of an autonomous movement device according to a second embodiment of the present invention.

As shown in FIG. 12, an autonomous movement device 101 according to the second embodiment has a configuration in which a cliff data memory 27 is added to the memory 20 of the autonomous movement device 100 according to the first embodiment and a cliff sensor 32 is added to the obstacle detector 30. In addition, a map memory 23 stores a cliff-sensor map created using data from the cliff sensor 32, and an update-amount memory 24 stores the update amount Δg for the value of each grid point on the cliff-sensor map. The update amount Δg can be considered as the speed (cancelling speed) for cancelling cliff information from the cliff-sensor map. In the following description, it is assumed that the cliff-sensor map is represented by a two-dimensional array variable MC [i, j], an environment map in which a laser-range-scanner map, a collision-sensor map, and a cliff-sensor map are integrated is represented by a two-dimensional array variable MI [i, j], and the update amount for the cliff-sensor map is represented by a two-dimensional array variable DG [i, j].

The cliff data memory 27 stores data (cliff data) indicating the position of a cliff (a hole, a cliff, or the like) obtained based on the self position and orientation of the autonomous movement device 101 when the cliff sensor 32 detects a cliff, and the position of the cliff sensor 32, which has detected the cliff, in the autonomous movement device 101.

Figure 13:
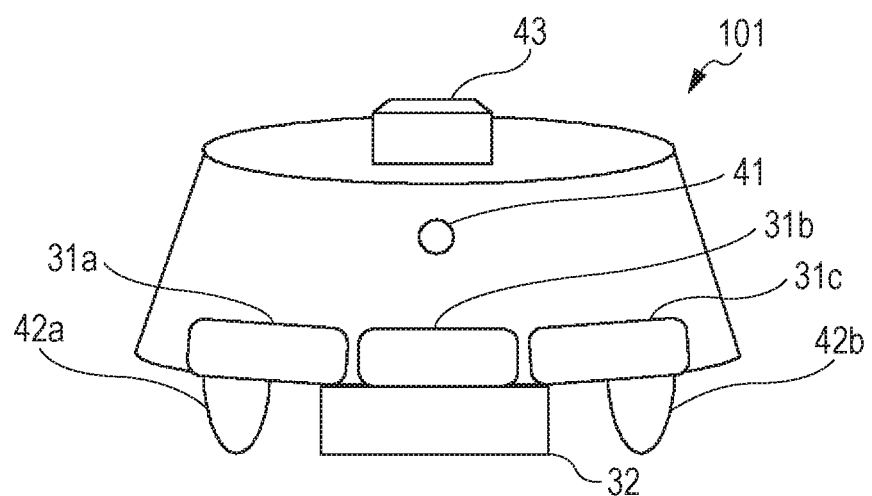
FIG. 13 is a diagram showing an appearance of the autonomous movement device according to the second embodiment.

The cliff sensor 32 is a sensor that detects whether a floor surface exists to detect a cliff (a hole, a cliff, or the like) that are places where no floor surface exists. Although the number of the cliff sensors 32 is arbitrary, the autonomous movement device 101 includes one cliff sensor 32 provided at the front of the autonomous movement device as shown in FIG. 13. When the cliff sensor 32 detects a cliff, the cliff sensor 32 notifies a controller 10 that the cliff has been detected. Then, the controller 10 registers, in the cliff data memory 27, the cliff data indicating the position of the cliff based on the self position and orientation of the autonomous movement device 101 at that time and the position of the cliff sensor 32, which has detected the cliff, in the autonomous movement device 101.

Figure 14:
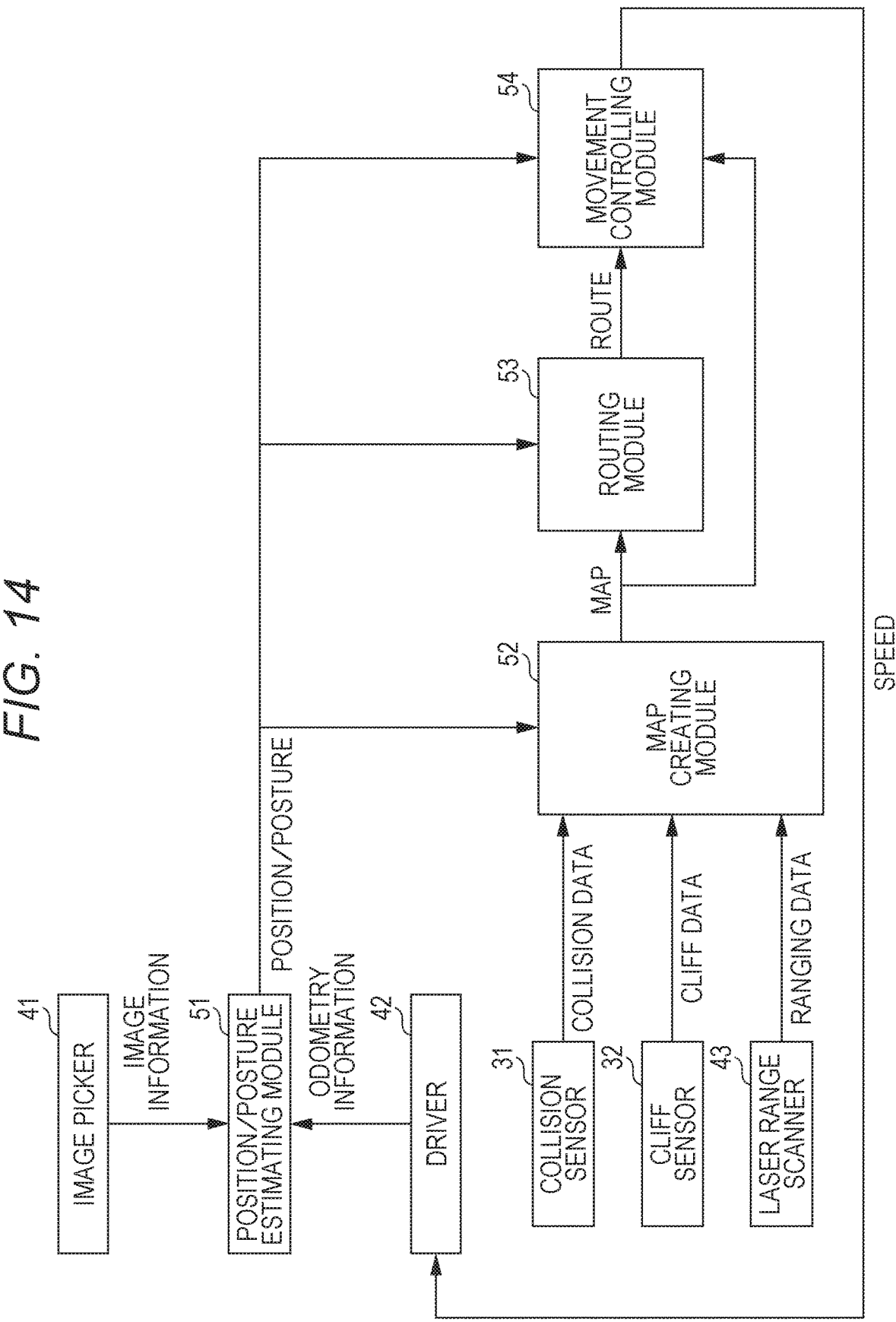
FIG. 14 is a diagram showing an overall configuration of a software module of the autonomous movement device according to the second embodiment.

As shown in FIG. 14, the overall configuration of a software module executed by the controller 10 of the autonomous movement device 101 has a configuration in which the cliff sensor 32 is added to the overall configuration of the software module of the autonomous movement device 100 described with reference to FIG. 4. A map creating module 52 of the autonomous movement device 101 creates an environment map using the cliff data obtained from the cliff sensor 32. The autonomous movement device 101 except for this point is the same as the autonomous movement device 100.

The processing of the map creating module 52 of the autonomous movement device 101 is described with reference to FIG. 15. This processing except for a part is common to the processing of the map creating module 52 of the autonomous movement device 100 described with reference to FIG. 6, and the different processing is mainly described.

The processing from steps S101 to S103 is the same as the processing in FIG. 6. Following step S103, an obstacle canceller 13 initializes the update amount Δg for the cliff-sensor map stored in the update-amount memory 24 (step S111). The initial value at this time is arbitrary, but is set to 10, for example. As specific processing, DG [i, j]=10 is executed for all "i" and "j" in 0≤i≤xsize, 0≤j≤ysize.

The subsequent processing from steps S104 to S107 is the same as the processing in FIG. 6. Following step S107, a map creator 12 performs processing for updating the cliff-sensor map (step S112). Details of the processing for updating the cliff-sensor map are described later. Thereafter, the map creator 12 creates an environment map in which the laser-range-scanner map, the collision-sensor map, and the cliff-sensor map are integrated (step S113), and the processing returns to the step S104.

The environment map in which the laser-range-scanner map, the collision-sensor map, and the cliff-sensor map are integrated is a map for enabling the autonomous movement device 101 to recognize information which recorded only on one of the laser-range-scanner map, the collision-sensor map, and the cliff-sensor map. Specifically, the following processing is performed for all "i" and "j" in 0≤i≤xsize, 0≤j≤ysize.

(1) If MA [i, j]<0 and MB [i, j]<0 and MC [i, j]<0, MI [i, j]=min (MA [i, j], MB [i, j], MC [i, j]) is to be satisfied.

(2) If MA [i, j]≥0 and MB [i, j]≥0 or MC [i, j]≥0, MI [i, j]=min (MA [i, j], MB [i, j], MC [i, j]) is to be satisfied.

Figure 15:
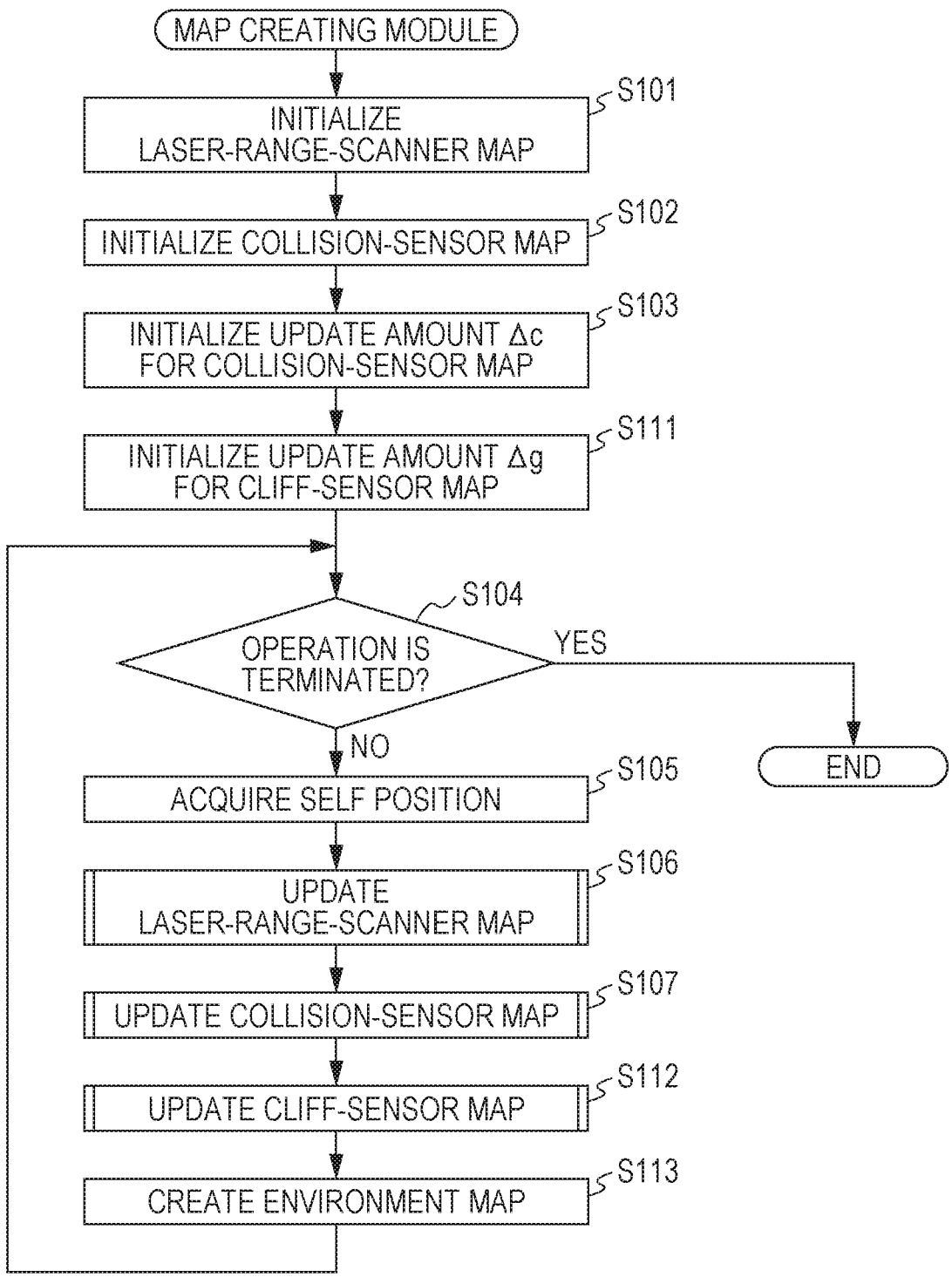
FIG. 15 is a flowchart of a map creating module according to the second embodiment.
Figure 16:
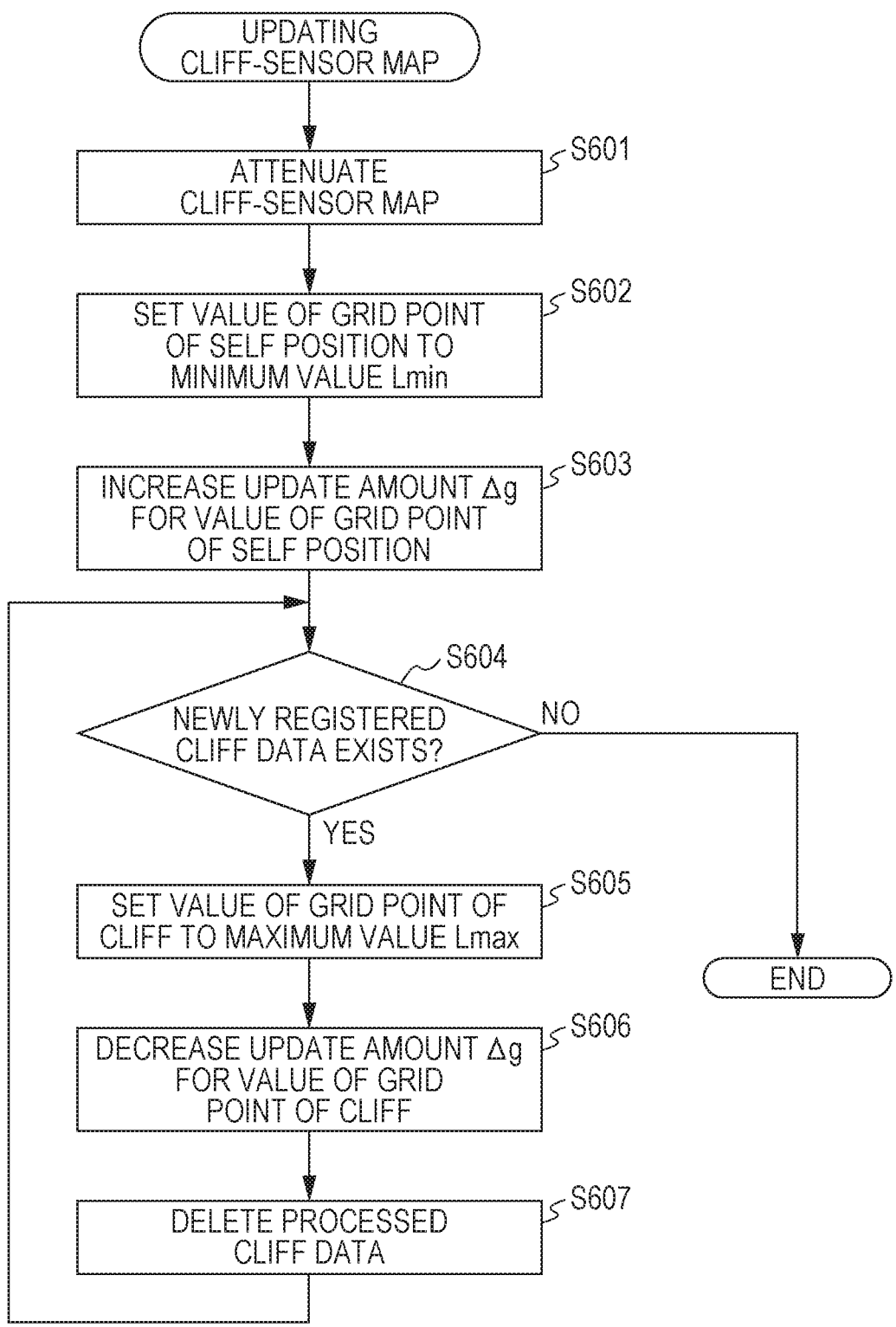
FIG. 16 is a flowchart of processing for updating a cliff-sensor map according to the second embodiment.

Next, the processing for updating the cliff-sensor map performed in step S112 in FIG. 15 is described with reference to FIG. 16. First, the obstacle canceller 13 attenuates the value of each grid point on the cliff-sensor map (step S601). Specifically, the following processing is executed for all "i" and "j".

(1) If MC [i, j]>0, MC [i, j]=MC [i, j]−DG [i, j] is to be satisfied.

(2) If MC [i, j]<0, MC [i, j]=MC [i, j]+DG [i, j] is to be satisfied.

Then, the map creator 12 sets the value of the grid point on the cliff-sensor map corresponding to the self position acquired in step S105 in FIG. 15 to the minimum value Lmin (step S602). Specifically, if the coordinates of the self position are [p, q], MC [p, q]=Lmin is executed. Then, the obstacle canceller 13 increases the update amount Δg for the value of the grid point on the cliff-sensor map corresponding to the self position by a reference-non-obstacle adjusting value (for example, 5) (step S603). Specifically, when the coordinates of the self position are [p, q], DG [p, q]=DG [p, q]+5 is executed. Here, if DG [p, q] exceeds Lmax, DG [p, q]=Lmax is to be satisfied.

Next, the map creator 12 determines whether cliff data newly registered in the cliff data memory 27 exists (step S604). When no cliff data newly registered in the cliff data memory 27 exists (step S604; No), the processing for updating the cliff-sensor map is terminated.

When cliff data newly registered in the cliff data memory 27 exists (step S604: Yes), the map creator 12 acquires the cliff data (the coordinates indicating the position at which the detected cliff exists) from the cliff data memory 27 and sets the value of the grid point on the cliff-sensor map at which the detected cliff exists to the maximum value Lmax (step S605). Specifically, when the coordinates of the colliding obstacle are [v, w], MC [v, w]=Lmax is executed. Then, the obstacle canceller 13 decreases the update amount Δg for the value of the grid point at which the detected cliff exists by a reference-obstacle adjusting value (for example, 5) (step S606). Specifically, when the coordinates of the colliding obstacle are [v, w], DG [v, w]=DG [v, w]−5 is executed. Here, if DG [p, q] is equal to or less than 0, DG [v, w]=1 is to be satisfied.

Then, the map creator 12 deletes, from the cliff data memory 27, the cliff data acquired in step S605 (step S607), and the processing returns to step S604. The cliff-sensor map is updated by the above processing for updating the cliff-sensor map, and the ghost of the cliff is prevented from remaining by the attenuating processing in step S601. In addition, by increasing or decreasing the value itself of the update amount Δg for the value of each grid point, the attenuating speed is decreased at a grid point at which the possibility that the cliff exists is high, and the attenuating speed is increased at a grid point at which the possibility of the cliff exists is low. This decreases the frequency of re-approaching unchanged cliffs (for example, the edges of tables or stands), and has the effect of increasing the speed for tracking changing cliffs (for example, holes having lids that are opened and closed such as manholes). Thus, the autonomous movement device 101 according to the second embodiment can appropriately reflect the appearance and disappearance of a cliff in the environment map, and can move efficiently.

(Fourth Modification)

In the autonomous movement device 101 according to the second embodiment, the obstacle detector 30 includes the collision sensor 31 and the cliff sensor 32, but is not limited thereto, and may include an arbitrary sensor X as long as the sensor X detects any obstacle by approaching the obstacle. In that case, the map creator 12 also records a sensor X map created using the data from the sensor X in the map memory 23, and creates an environment map in which all the environment maps for the provided sensors are integrated. The update-amount memory 24 also stores the update amount Δx for the value of each grid point on the sensor X map. As the sensor X, for example, a floor surface sensor that detects a rough route, a moisture sensor that detects a wet portion of a floor or a puddle, or the like can be used. By increasing the types of sensors provided to the obstacle detector 30, the autonomous movement device can create an environment map that flexibly deals with various environments and can move efficiently.

(Third Embodiment)

In each of the above embodiments, the obstacle detector 30 includes a sensor that detects an obstacle by approaching the obstacle (a close-obstacle detector) such as the collision sensor 31 or the cliff sensor 32. Then, the existence of the obstacle detected by the obstacle detector 30 is certainly ensured, and the value of the grid point at that position on the collision-sensor map is set to the maximum value Lmax. However, the obstacle detector 30 may be provided with a sensor that can detect an obstacle from a distance without approaching (a distant-obstacle detector, such as the laser range scanner 43). In this case, regarding obstacles detected by the obstacle detector 30 (obstacles detected not only by the laser range scanner 43 but also by a sensor that detects an obstacle by approaching the obstacle such as the collision sensor 31), the existence probabilities of the obstacles at the position may be updated. Specifically, instead of setting the value of the grid point at the position (the position of the colliding obstacle) on the collision-sensor map to the maximum value Lmax, the update amount Δr may be added to the value of the grid point at the position. A third embodiment in which the collision-sensor map and the laser-range-scanner map are updated and attenuated with a similar approach by this processing is described.

Figure 17:
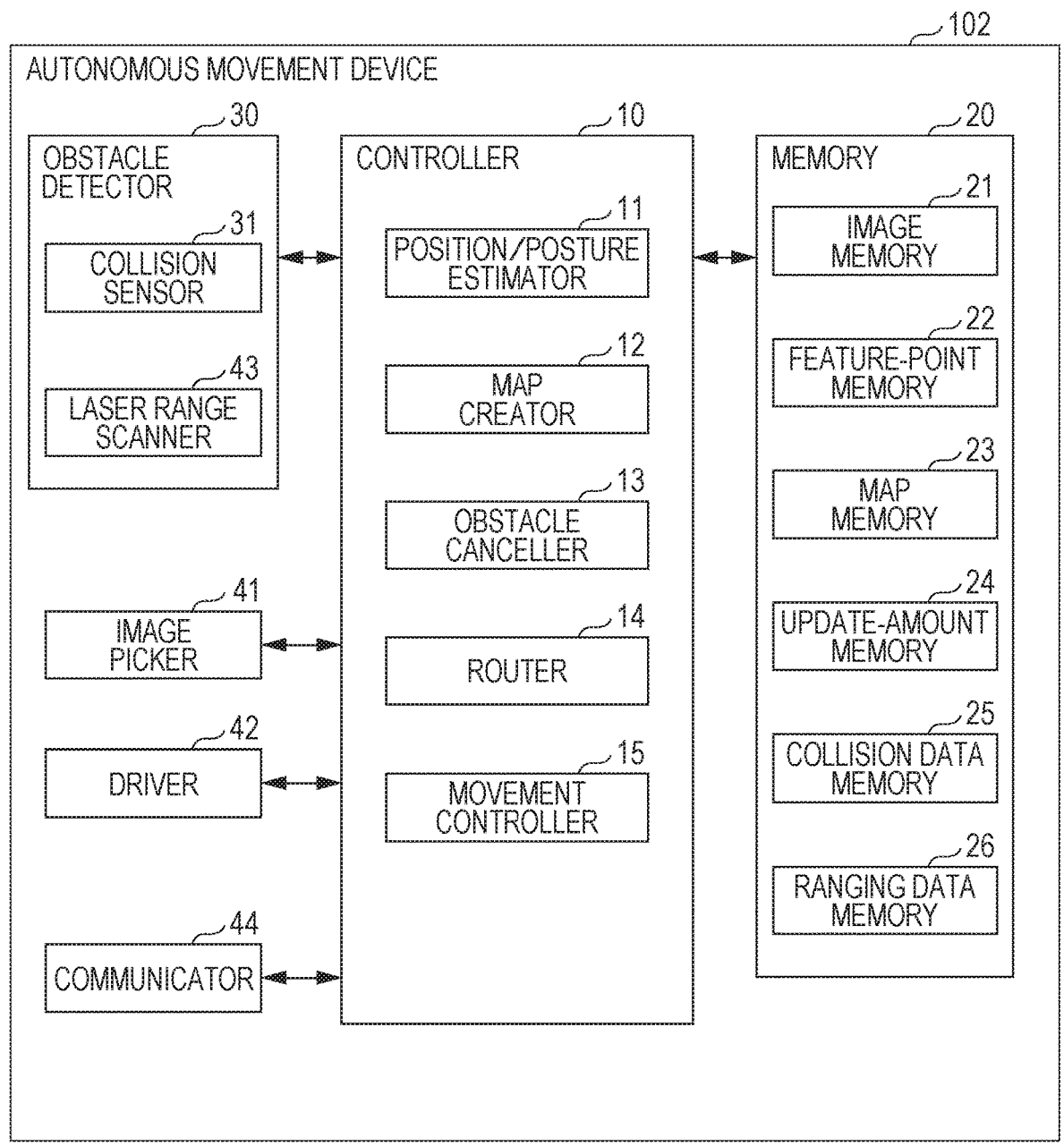
FIG. 17 is a diagram showing a functional configuration of an autonomous movement device according to a third embodiment of the present invention.

As shown in FIG. 17, an autonomous movement device 102 according to the third embodiment includes a laser range scanner 43 in addition to a collision sensor 31 in the obstacle detector 30 of the autonomous movement device 100 according to the first embodiment. A map memory 23 stores an environment map (MI [i, j]) in which both sensor-maps of a laser-range-scanner map (MA [i, j]) and a collision-sensor map (MB [i, j]) are integrated. An update-amount memory 24 stores the update amount for the collision-sensor map and the update amount for the laser-range-scanner map. The update amount for the collision-sensor map includes the value Δco common to all grid points and the value DCT [i, j] of the update amount (attenuating amount) for a grid point [i, j]. The update amount for the laser-range-scanner map includes the value Δro common to all grid points and a value DRT [i, j] of the update amount (attenuating amount) for a grid point [i, j]. Here, when xsize is the coordinate of the maximum grid point in the X direction of the environment map and ysize is the coordinate of the maximum grid point in the Y direction of the environment map, $0 \leq i \leq xsize$, $0 \leq j \leq ysize$ is satisfied.

The update amount Δco is a value to be subtracted from the value of the grid point of the self position on the collision-sensor map (no obstacle exists because the device exists), and is a value to be added to the value of the grid point at the position of an obstacle when the collision sensor 31 detects the obstacle. The update amount DCT [i, j] is the attenuating amount of the value of each grid point used for attenuating the collision-sensor map. All these values are positive numbers and are set to, for example, 10. Furthermore, if the value of DCT [i, j] becomes too large, the speed for cancelling obstacle information from the collision-sensor map is too fast, and it is desirable that the maximum value DCmax is set and DCT [i, j]=DCmax is to be satisfied when the value of DCT [i, j] is equal to or greater than DCmax. The value of DCmax changes its proper value depending on the time required for cancelling the obstacle and the cycle for attenuating the map (the proper value is obtained by dividing Lmax by a value obtained by dividing the time required for cancelling the obstacle by the cycle for attenuating the map). For example, when the time to cancel the obstacle is desired to be 60 seconds or more at the shortest and the cycle of the attenuating processing is 5 seconds, the proper value is obtained by DCmax=Lmax/12.

The update amount Δro is a value to be subtracted from the value of the grid point on the laser-range-scanner map corresponding to the position at which no obstacle has been detected by the laser range scanner 43, and is a value to be added to the value of the grid point corresponding to the position of an obstacle when the laser range scanner 43 detects the obstacle. The update amount DRT [i, j] is the attenuating amount for the value of each grid point used for attenuating the laser-range-scanner map. All these values are also positive numbers and are set to, for example, 5. Furthermore, if the value of DRT [i, j] becomes too large, the speed for cancelling obstacle information from the laser-range-scanner map is too fast, and it is desirable that the maximum value DRmax is set and DRT [i, j]=DRmax is to be satisfied when the value of DRT [i, j] is equal to or greater than DRmax. The value of DRmax changes its proper value depending on the time required for cancelling the obstacle and the cycle for attenuating the map (the proper value is obtained by dividing Lmax by a value obtained by dividing the time required for cancelling the obstacle by the cycle for attenuating the map). For example, when the time to cancel the obstacle is desired to be 60 seconds or more at the shortest and the cycle of the attenuating processing is 5 seconds, the proper value is obtained by DRmax=Lmax/12.

Figure 18:
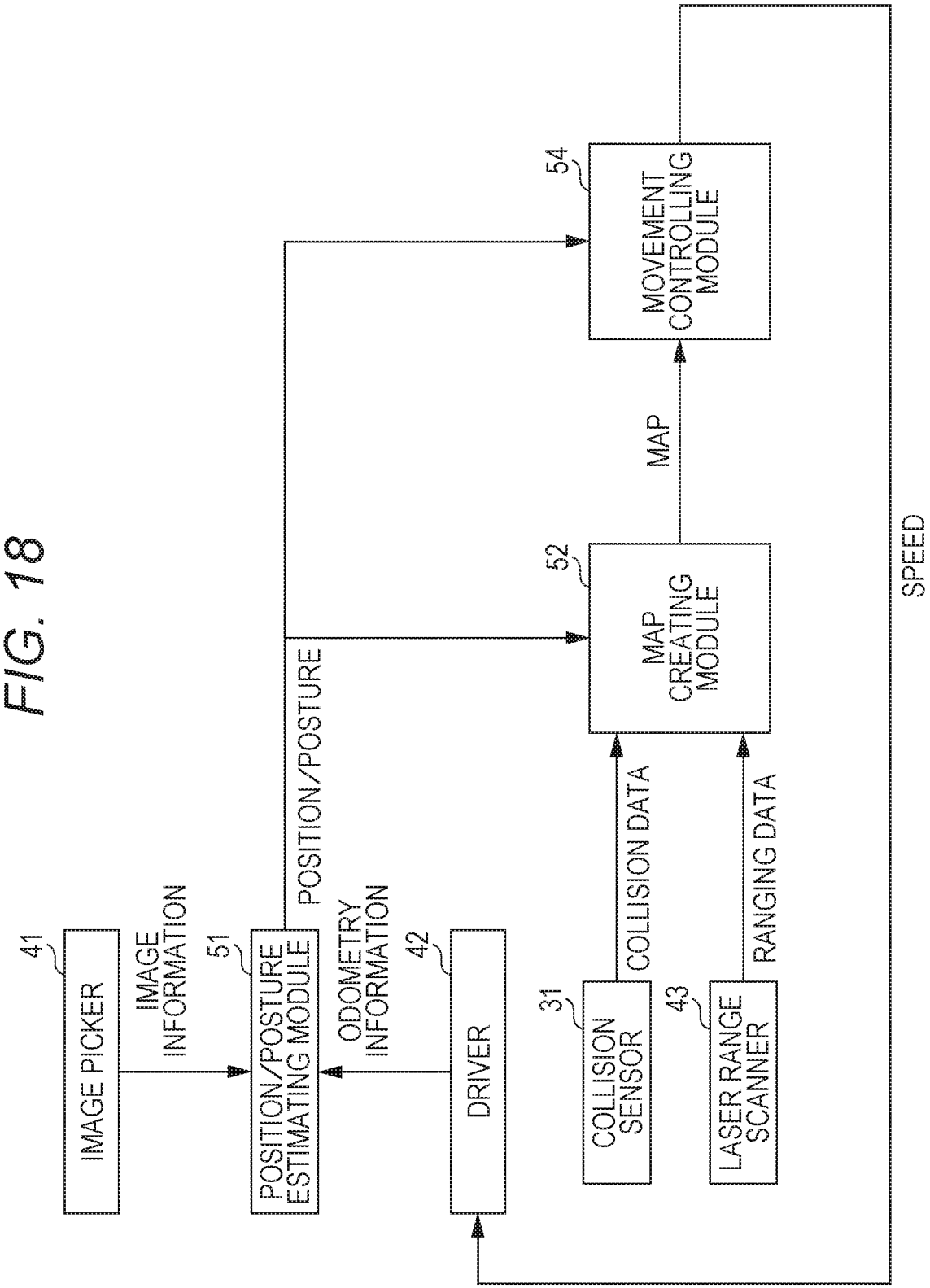
FIG. 18 is a diagram showing an overall configuration of a software module of the autonomous movement device according to the third embodiment.

As shown in FIG. 18, the overall configuration of a software module executed by a controller 10 of the autonomous movement device 102 has a configuration in which the routing module 53 is removed from the overall configuration of the software module of the autonomous movement device 100 described with reference to FIG. 4. Actually, as shown in the flowchart of a movement controlling module 54 to be described later, the combination of the routing module 53 and the movement controlling module 54 of the autonomous movement device 100 serves as the movement controlling module 54 of the autonomous movement device 102. In each of the above embodiments, it has been described that each software module is executed in a separate thread. However, in order to explain that a part or all of the software modules can be executed in the same thread, an example in which the routing module 53 and the movement controlling module 54 are executed in the same thread (in the movement controlling module 54 of the autonomous movement device 102) is described in the third embodiment.

Figure 19:
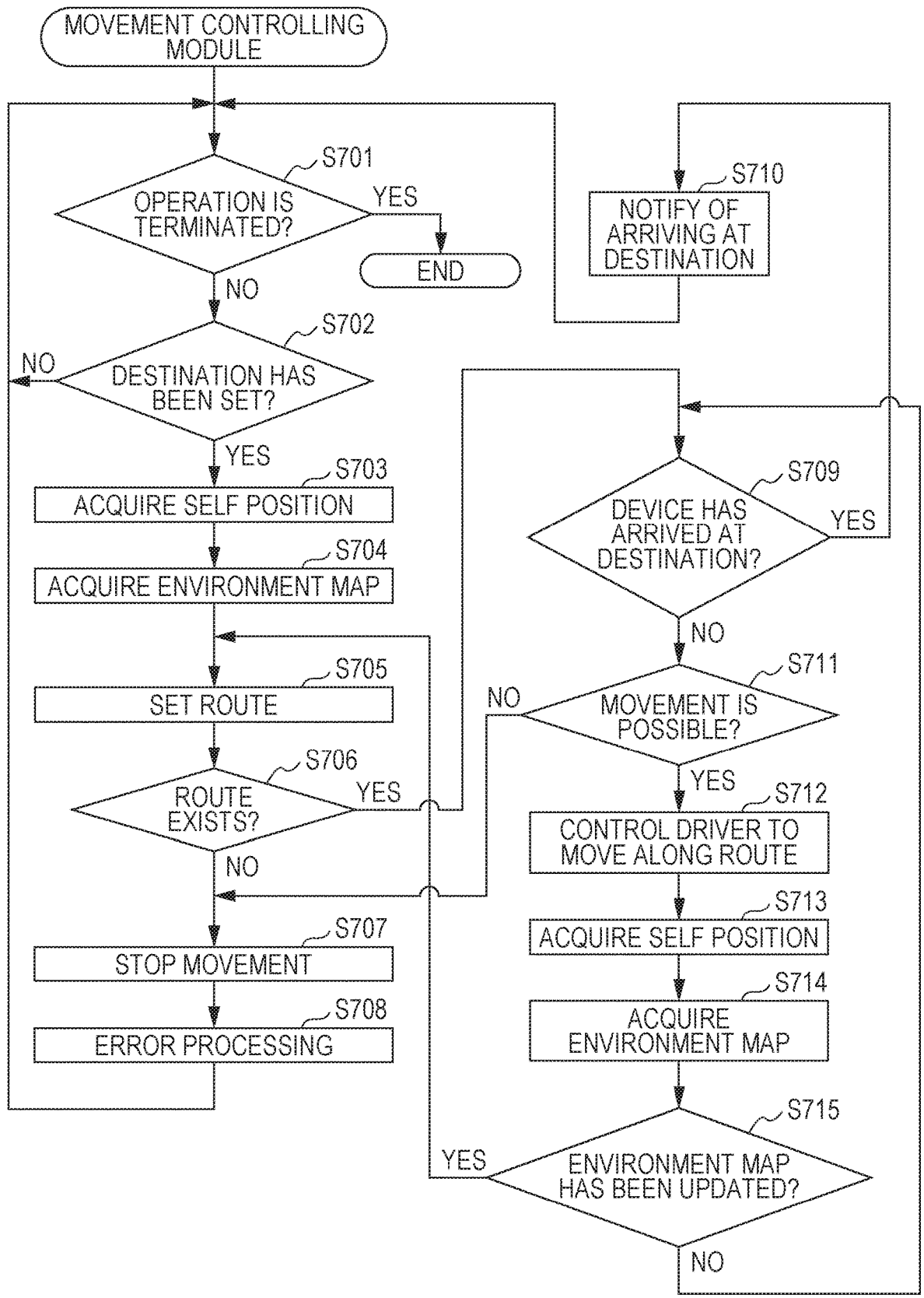
FIG. 19 is a flowchart of a movement controlling module according to the third embodiment.

The processing of the movement controlling module 54 of the autonomous movement device 102 is described with reference to FIG. 19.

First, the controller 10 determines whether the autonomous movement device 102 terminates the operation (step S701). When the autonomous movement device 102 terminates the operation (step S701; Yes), the processing is terminated. When the autonomous movement device 102 does not terminate the operation (step S701; No), a router 14 determines whether a destination has been set (step S702). The destination is set by the user of the autonomous movement device 102 via a communicator 44, or is autonomously set by the autonomous movement device 102 as needed (for example, when the remaining quantity of the battery is less than a predetermined quantity (for example, 10%), the charging station is set as the destination, or the like).

When the destination has not been set (step S702; No), the processing returns to step S701. When the destination has been set (step S702: Yes), the router 14 acquires the current self position and posture estimated by a position/posture estimator 11 (step S703). Next, the router 14 acquires the latest environment map at that time created by the processing of a map creating module 52 to be described later (step S704). The environment map is an environment map in which the laser-range-scanner map and the collision-sensor map are integrated (a map represented by a two-dimensional array variable MI [i, j]). Then, the router 14 sets a route from the current position to the destination based on the acquired environment map, self position, and posture and the set destination (step S705). Step S705 is also referred to as a route setting step.

Then, the router 14 determines whether a route has been set (whether a route exists) (step S706). When no route exists (step S706; No), a movement controller 15 controls a driver 42 to stop the movement (step S707), and performs error processing such as notifying the user that no route exists via the communicator 44 (step S708), and the processing returns to step S701.

When a route exists (has been set) (step S706: Yes), the movement controller 15 determines whether the device has arrived at the destination (step S709). Since the information about the route set in step S705 also includes the information about the destination, the movement controller 15 determines whether the self position matches the destination included in the route information to determine that the device has arrived at the destination.

When the device has arrived at the destination (step S709; Yes), the movement controller 15 notifies the user that the device has arrived at the destination (step S710), and the processing returns to step S701. When the device has not arrived at the destination (step S709; No), the movement controller 15 determines whether the device can move along the route (step S711). When the device cannot move along the route (step S711; No), the processing proceeds to step S707 to perform the error processing. When the device can move along the route (step S711; Yes), the movement controller 15 controls the driver 42 to move along the route (step S712).

Then, the movement controller 15 acquires the current self position and posture estimated by the position/posture estimator 11 (step S713). Next, the movement controller 15 acquires the latest environment map at that time created by the processing of the map creating module 52 to be described later (step S714). Then, the movement controller 15 determines whether the acquired environment map has been updated from the previous environment map (step S715). When the acquired environment map has been updated (step S715; Yes), the processing returns to step S705 to reset the route. When the acquired environment map has not been updated (step S715; No), the processing returns to step S709.

By the above processing of the movement controlling module 54, the autonomous movement device 102 can move to the destination.

Figure 20:
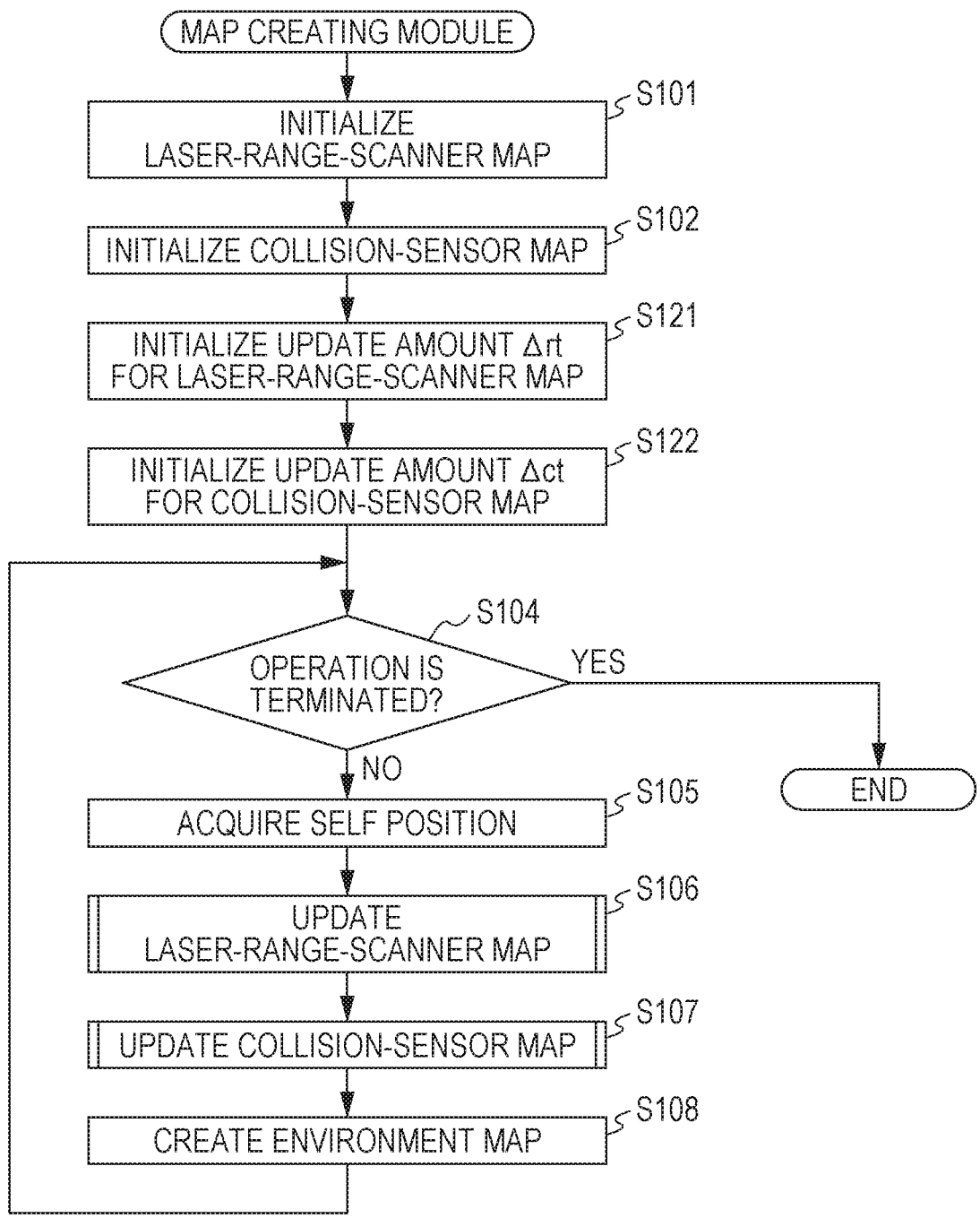
FIG. 20 is a flowchart of a map creating module according to the third embodiment.

Next, the processing of the map creating module 52 of the autonomous movement device 102 is described with reference to FIG. 20. This processing corresponds to the processing in which step S103 in the processing of the map creating module 52 of the autonomous movement device 100 described with reference to FIG. 6 is replaced with steps S121 and S122, and the processing for updating the laser-range-scanner map update in step S106 and the processing for updating the collision-sensor map in step S107 are also different from the processing of the autonomous movement device 100. Thus, the processing in steps S121 and S122 is described, and then the processing for updating the laser-range-scanner map and for the collision-sensor map of the autonomous movement device 102 is described.

First, in step S121, an obstacle canceller 13 initializes DRT [i, j] which is the update amount (attenuating amount) for the laser-range-scanner map stored in the update-amount memory 24. The initial value at the time of initialization is arbitrary, but is set to 5, for example. As specific processing, DRT [i, j]=5 is executed for all "i" and "j" in 0≤i≤xsize, 0≤j≤ysize.

Next, in step S122, the obstacle canceller 13 initializes DCT [i, j] which is the update amount (attenuating amount) for the collision-sensor map stored in the update-amount memory 24. The initial value at the time of initialization is arbitrary, but is set to 10, for example. As specific processing, DCT [i, j]=10 is executed for all "i" and "j" in 0≤i≤xsize, 0≤j≤ysize.

Figure 21:
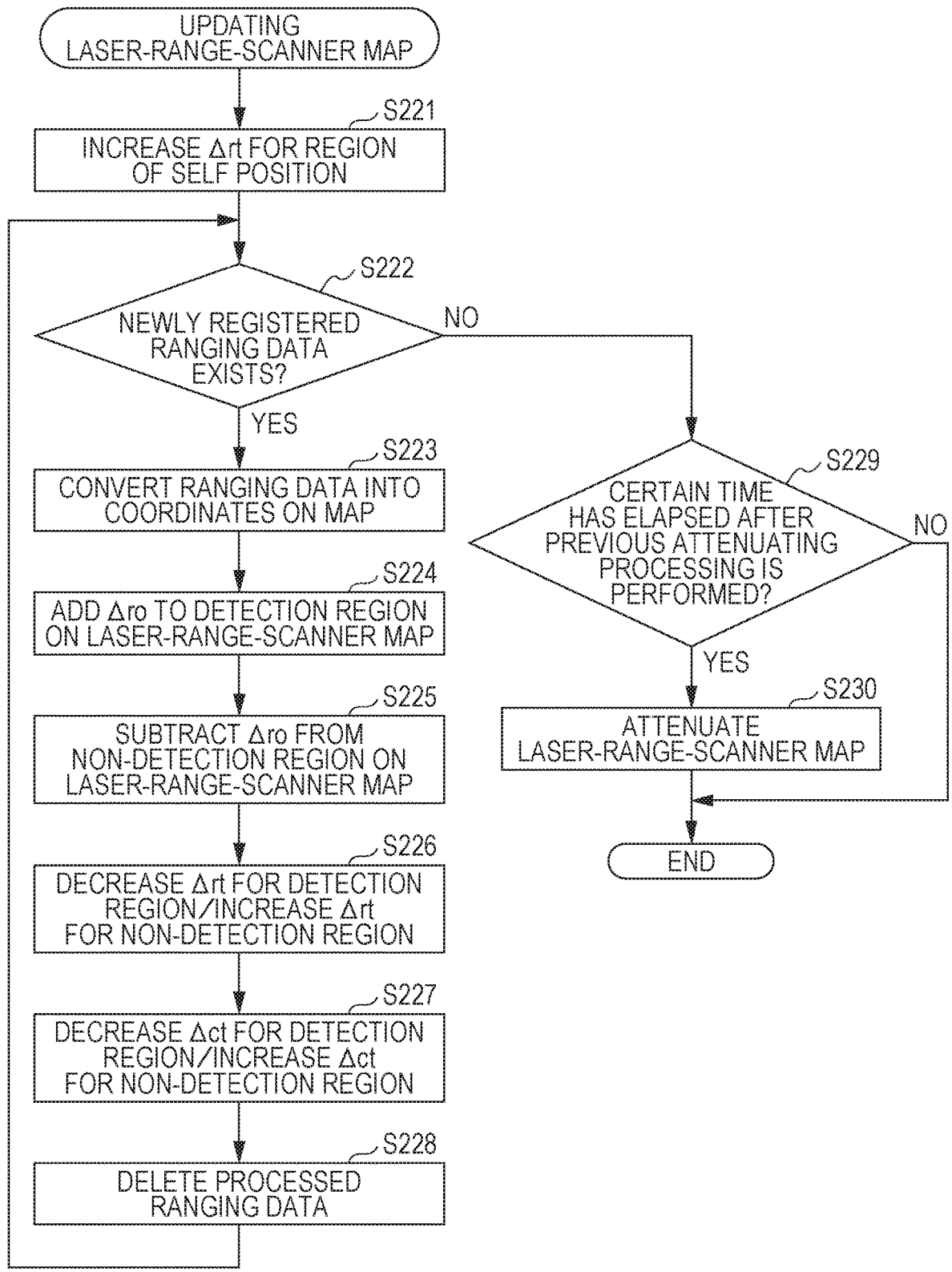
FIG. 21 is a flowchart of processing for updating a laser-range-scanner map according to the third embodiment.

Next, the processing for updating the laser-range-scanner map performed in step S106 in the processing of the map creating module 52 (FIG. 20) is described with reference to FIG. 21.

When the coordinates of the current position (self position) of the device are represented by [p, q], the obstacle canceller 13 increases the DRT [p, q] which is the update amount (attenuating amount) for the grid point on the laser-range-scanner map corresponding to the self position by a reference-non-obstacle adjusting value (for example, 3) for the laser-range-scanner map (step S221). That is, when the reference-non-obstacle adjusting value for the laser-range-scanner map is 3, DRT [p, q]=DRT [p, q]+3 is executed. However, when the value of DRT [p, q] is greater than the maximum value DRmax of DRT, DRT [p, q]=DRmax is to be satisfied.

Next, the map creator 12 determines whether ranging data newly registered in a ranging data memory 26 exists (step S222). When ranging data newly registered in the ranging data memory 26 exists (step S222; Yes), the map creator 12 acquires the ranging data from the ranging data memory 26 and converts the ranging data into the coordinates on the laser-range-scanner map using the self position and posture acquired in step S105 in FIG. 20 (step S223). The coordinates indicate the grid point (region) at which an obstacle has been detected by the laser range scanner 43 on the laser-range-scanner map, and the map creator 12 functions, in this step, as an obstacle position acquirer that acquires the position of the obstacle from a distance. Here, it is assumed that, for example, an obstacle has been detected at the coordinates of [m, n] on the laser-range-scanner map.

Then, the map creator 12 adds the update amount Δro to the value of the grid point on the laser-range-scanner map at which the obstacle has been detected (step S224). Specifically, MA [m, n]=MA [m, n]+Δro is executed. However, when MA [m, n] exceeds the maximum value Lmax at this time, MA [m, n]=Lmax is to be satisfied.

Next, the map creator 12 subtracts the update amount Δro from the value of each grid point on the laser-range-scanner map at which no obstacle has been detected within the observation (scanning) range of the laser range scanner 43 (step S225).

Specifically, MA [i, j]=MA [i, j]−Δro is executed for all [i, j] before [m, n] in the direction in which the obstacle has been detected and for all [i, j] within the observation range of the laser range scanner 43 in the direction in which no obstacle has been detected. However, when MA [i, j] is less than the minimum value Lmin at this time, MA [i, j]=Lmin is to be satisfied.

Then, the obstacle canceller 13 decreases, by a reference-obstacle adjusting value for the laser-range-scanner map (for example, 3), the value of the update amount (attenuating amount) DRT [m, n] for the laser-range-scanner map corresponding to the grid point at which the obstacle has been detected, and increases, by the reference-non-obstacle adjusting value for the laser-range-scanner map (for example, 3), the value of the update amount (attenuating amount) DRT [i, j] for the laser-range-scanner map corresponding to each grid point at which no obstacle has been detected (step S226). If DRT [m, n] is equal to or less than 0 here, DRT [m, n]=1 is to be satisfied. Also, if DRT [i, j] is equal to or greater than DRmax, DRT [i, j]=DRmax is to be satisfied.

Next, the obstacle canceller 13 decreases, by the reference-obstacle adjusting value (for example, 5), the value of the update amount (attenuating amount) DCT [m, n] for the collision-sensor map corresponding to the grid point at which the obstacle has been detected, and increases, by the reference-non-obstacle adjusting value (for example, 5), the value of the update amount (attenuating amount) DCT [i, j] for the collision-sensor map corresponding to the grid point at which no obstacle has been detected (step S227). If DCT [m, n] is equal to or less than 0 here, DCT [m, n]=1 is to be satisfied. Also, if DCT [i, j] is equal to or greater than DCmax, DCT [i, j]=DCmax is to be satisfied.

Then, the map creator 12 deletes, from the ranging data memory 26, the ranging data acquired in step S223 (step S228), and the processing returns to step S222.

On the other hand, in step S222, when no ranging data newly registered in the ranging data memory 26 exists (step S222; No), the obstacle canceller 13 determines whether a certain time (the cycle of the attenuating processing, for example, 5 seconds) has elapsed after the previous attenuating processing is performed to the laser-range-scanner map (step S229). When the certain time has not elapsed (step S229; No), the processing for updating the laser-range-scanner map is terminated. When the certain time has elapsed (step S229; Yes), the obstacle canceller 13 attenuates the laser-range-scanner map (step S230) and then, the processing for updating the laser-range-scanner map is terminated.

Step S230 is also referred to as an obstacle cancelling step. Specifically, in this step, the obstacle canceller 13 performs the following processing for all the grid points on the laser-range-scanner map, that is, for all "i" and "j" in 0≤i≤xsize, 0≤j≤ysize. (However, the processing of (1) in the following processing is essential, and the processing of (2) may not be performed.)

(1) If MA [i, j]>0, MA [i, j]=MA [i, j]−DRT [i, j] is to be satisfied.

(2) If MA [i, j]<0, MA [i, j]=MA [i, j]+DRT [i, j] is to be satisfied.

The laser-range-scanner map is updated by the above processing for updating the laser-range-scanner map, and the existence probability of the obstacle is indicated by the value of each grid point on the laser-range-scanner map.

Figure 22:
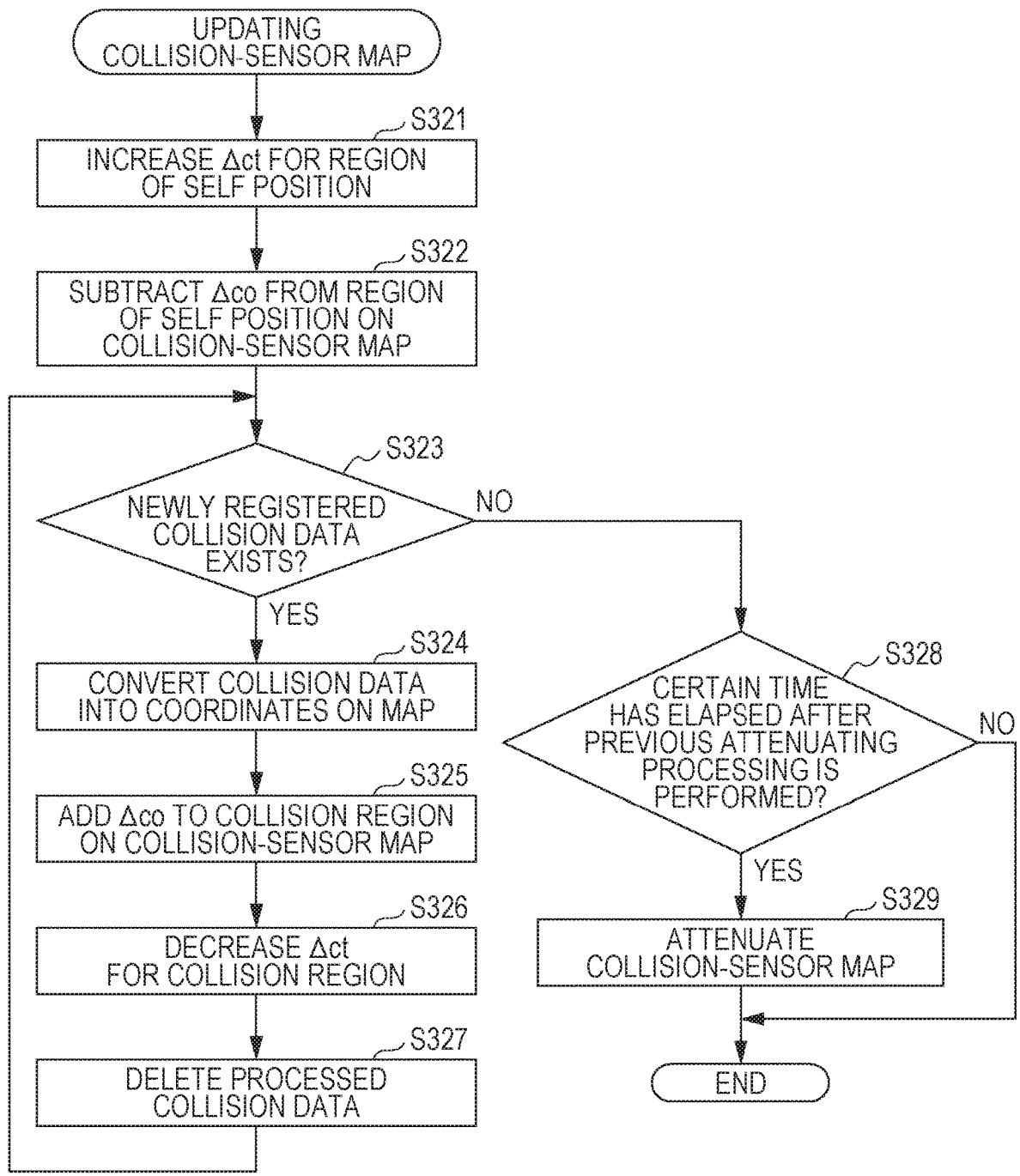
FIG. 22 is a flowchart of processing for updating a collision-sensor map according to the third embodiment.

Next, the processing for updating the collision-sensor map performed in step S107 in the processing of the map creating module 52 (FIG. 20) is described with reference to FIG. 22.

When the coordinates of the current position (self position) of the device are represented by [p, q], the obstacle canceller 13 increases the DCT [p, q] which is the update amount (attenuating amount) for the grid point on the collision-sensor map corresponding to the self position by the reference-non-obstacle adjusting value (for example, 5) (step S321). That is, when the reference-non-obstacle adjusting value is 5, DCT [p, q]=DCT [p, q]+5 is executed. However, when the value of DCT [p, q] is greater than the maximum value DCmax of DCT, DCT [p, q]=DCmax is to be satisfied.

Next, the obstacle canceller 13 subtracts the update amount Δco from the value of the grid point on the collision-sensor map corresponding to the self position (step S322). Specifically, MB [p, q]=MB [p, q]−Δco is executed. However, if MB [p, q] is less than the minimum value Lmin at this time, MB [p, q]=Lmin is to be satisfied.

Then, the map creator 12 determines whether collision data newly registered in a collision data memory 25 exists (step S323). When collision data newly registered in the collision data memory 25 exists (step S323; Yes), the map creator 12 acquires the collision data from the collision data memory 25 and converts the collision data into the coordinates on the collision-sensor map using the self position and posture acquired in step S105 in FIG. 20 (step S324). The coordinates indicate the grid point (region) on the collision-sensor map at which the obstacle has been detected by the collision sensor 31. Here, it is assumed that, for example, an obstacle is detected at the coordinates of [m, n] on the collision-sensor map.

Then, the map creator 12 adds the update amount Δco to the value of the grid point on the collision-sensor map at which the obstacle has been detected (step S325). Specifically, MB [m, n]=MB [m, n]+Δco is executed. However, if MB [m, n] exceeds the maximum value Lmax at this time, MB [m, n]=Lmax is to be satisfied.

Then, the obstacle canceller 13 decreases the value of the update amount (attenuating amount) DCT [m, n] for the collision-sensor map corresponding to the grid point at which the obstacle has been detected by the reference-obstacle adjusting value (for example, 5) (step S326). If DCT [m, n] is equal to or less than 0 here, DCT [m, n]=1 is to be satisfied.

Then, the map creator 12 deletes, from the collision data memory 25, the collision data acquired in step 5324 (step S327), and the processing returns to step S323.

On the other hand, in step S323, when no collision data newly registered in the collision data memory 25 exists (step S323; No), the obstacle canceller 13 determines whether a certain time (the cycle of the attenuating processing, for example, 5 seconds) has elapsed after the previous attenuating processing is performed to the collision-sensor map (step S328). When the certain time has not elapsed (step S328; No), the processing for updating the collision-sensor map is terminated. When the certain time has elapsed (step S328; Yes), the obstacle canceller 13 attenuates the collision-sensor map (step S329) and then, the processing for updating the collision-sensor map is terminated.

Step S329 is also referred to as an obstacle cancelling step. Specifically, in this step, the obstacle canceller 13 performs the following processing for all the grid points on the collision-sensor map, that is, for all "i" and "j" in 0≤i≤xsize, 0≤j≤ysize. (However, the processing of (1) in the following processing is essential, and the processing of (2) may not be performed.)

(1) If MB [i, j]>0, MB [i, j]=MB [i, j]−DCT [i, j] is to be satisfied.

(2) If MB [i, j]<0 MB [i, j]=MB [i, j]+DCT [i, j] is to be satisfied.

The collision-sensor map is updated by the above processing for updating the collision-sensor map, and the existence probability of the obstacle is indicated by the value of each grid point on the collision-sensor map.

By the above processing, in the autonomous movement device 102, the obstacle canceller 13 decreases the obstacle existence probability not only on the collision-sensor map depending on the passage of time, but also on the laser-range-scanner map according to the passage of time. In addition, the obstacle canceller 13 can set the speed for decreasing the existence probability to a different value for each grid point on the collision-sensor map and the laser-range-scanner map, and efficiently decrease the existence probability depending on the property of the object.

For example, since it is obvious that no obstacle exists at the self position, the update amount (attenuating amount) for the value of the grid point at the self position is increased to increase the speed for decreasing the existence probability of the obstacle. In addition, the update amount (attenuating amount) for the value of the grid point corresponding to the position at which the obstacle has been detected is decreased to decrease the speed for decreasing the existence probability of the obstacle immediately after the detection of the obstacle. Furthermore, the update amount (attenuating amount) for the value of the grid point corresponding to the position at which no obstacle has been detected is increased to increase the speed for decreasing the existence probability of the obstacle remaining on the map despite the fact that the obstacle has not been detected.

By this processing, the information about not only obstacles with which the device collided in the past, but also obstacles which have been detected by the laser range scanner 43 in the past and then moved to a position out of the observation (scanning) range of the laser range scanner 43 is cancelled after a certain time elapses. Thus, it is possible for the autonomous movement device 102 to set a route that does not avoid the position at which the obstacle existed in the past and to move. For this reason, it is possible for the autonomous movement device 102 to prevent unnecessary obstacle-avoiding operation and to move efficiently.

In addition, in the autonomous movement device 102, when a position at which the obstacle existed in the past is out of the observation range of the laser range scanner 43, the information about the obstacle is cancelled from the map with the passage of time. For this reason, the position at which the obstacle existed is determined that no obstacle exists after a certain period of time and is easily included in the moving route to the destination, and which increases the possibility that the laser range scanner 43 observes the position.

Note that, the autonomous movement device 102 includes the collision sensor 31 and the laser range scanner 43 as the obstacle detector 30, but may use either one of them. In this case, the collision-sensor map or the laser-range-scanner map can be directly used as the environment map.

In addition, the obstacle canceller 13 sets a collision-sensor map attenuating speed which is the speed for decreasing the obstacle existence probability on the collision-sensor map depending on the passage of time (the speed is adjusted by the reference-obstacle adjusting value and the reference-non-obstacle adjusting value), and a laser-range-scanner map attenuating speed which is the speed for decreasing the obstacle existence probability on the laser-range-scanner map depending on the passage of time (the speed is adjusted by the reference-obstacle adjusting value for the laser-range-scanner map and the reference-non-obstacle adjusting value for the laser-range-scanner map) so as to be different from each other. Since the collision sensor 31 detects an obstacle in a very narrow range as compared with the laser range scanner 43, it is generally considered that the adjusting amount for the collision-sensor map attenuating speed is to be greater than the adjusting amount for the laser-range-scanner map attenuation speed. This is because the speed for tracking an obstacle on the collision-sensor map can be increased.

Thus, in the above third embodiment, the initial value of DCT is set to be greater than the initial value of DRT, the reference-non-obstacle adjusting value for the collision-sensor map is set to be greater than the reference-non-obstacle adjusting value for the laser-range-scanner map, and the reference-obstacle adjusting value for the collision-sensor map is set to be greater than the reference-obstacle adjusting value for the laser range scanner.

In each of the above embodiments, the position/posture estimator 11 estimates the self position and posture of the autonomous movement device 100 by the SLAM processing, but the present invention is not limited thereto. For example, the position/posture estimator 11 may estimate the self position and posture only by odometry information that can be acquired from the driver 42 without performing the SLAM processing. Furthermore, the position/posture estimator 11 may acquire radio waves from, for example, a global positioning system (GPS) satellite and estimate the self position and posture by GPS.

In each of the above-described embodiments, the ranging data memory 26 stores ranging data indicating the distance to the object detected by the laser range scanner 43 together with the information about the angle at which the object has been detected, but the present invention is not limited thereto. For example, similarly to the collision data memory 25, the ranging data memory 26 may store data indicating the position of the object (obstacle) detected by the laser range scanner 43 obtained based on the self position and orientation of the autonomous movement device when the surroundings are observed (scanned) by the laser range scanner 43 and the ranging data and angle acquired by the laser range scanner 43. In this manner, it is unnecessary to perform the processing for converting the ranging data to the coordinates on the map (steps S202 and S223) in the processing for updating the laser-range-scanner map (FIGS. 7, 11, and 21).

In each of the above embodiments, the maximum value of the value of each grid point on each sensor map is used when the environment map in which the sensor maps are integrated is creased, but the present invention is not limited thereto. For example, the product of the existence probabilities of obstacles on the sensor maps may be used. For example, the map creator 12 may create, in step S108 in FIG. 6 or FIG. 20, an environment map in which the laser-range-scanner map and the collision-sensor map are integrated by executing the following expression for all "i" and "j" in 0≤i≤xsize, 0≤j≤ysize.

$$MI[i,j]=1-(1/(1+\exp(k \times MA[i,j]))) \times (1/(1+\exp(k \times MB[i,j])))$$

Furthermore, in the first embodiment, an obstacle may be detected only by the collision sensor 31 without the laser range scanner 43. In this case, it is also unnecessary to create and update the laser-range-scanner map, and the autonomous movement device 100 can use only the collision-sensor map as the environment map.

Furthermore, in each of the above embodiments, a depth camera or sonar may be provided instead of the laser range scanner 43 and the obstacle observed by the them may be recorded on an environment map similar to the laser-range-scanner map.

In each of the above embodiments, an obstacle may be detected by the visual SLAM using the image photographed by the image picker 41 without the laser range scanner 43, and the obstacle detected by the visual SLAM may be recorded on an environment map similar to the laser-range-scanner map.

In each of the above embodiments, an error or the like is notified to the user via, for example, the communicator 44. However, the autonomous movement device may be provided with an output unit such as a display or a speaker to notify the user of an error or the like. In each of the above embodiments, an instruction such as a destination from the user is accepted via, for example, the communicator 44. However, the autonomous movement device may include an input unit such as a touch panel or a microphone to accept an instruction from the user.

Furthermore, in the processing for updating the laser-range-scanner map (FIGS. 7 and 11) according to the above first or second embodiment, the processing for attenuating the laser-range-scanner map (the processing corresponding to step S301 in the processing for updating the collision-sensor map (FIG. 8)) may be performed immediately before step S201 Specifically, the obstacle canceller 13 performs the following processing for all "i" and "j". However, the following Δs (the attenuating amount for the laser-range-scanner map) is preset to a value smaller than the update amount Δr and the update amount Δc, for example, 1 or the like.

(1) If MA [i, j]>0, MA [i, j]=MA [i, j]−Δs is to be satisfied.
(2) If MA [i, j]<0, MA [i, j]=MA [i, j]+Δs is to be satisfied.

Similarly to the processing for attenuating the collision-sensor map, the attenuating amount Δs for the value of each grid point on the laser-range-scanner map is stored (for example, in DS [i, j]), and the attenuating mount Δs for the value of each grid point may be increased or decreased depending on whether the obstacle has been detected by the laser range scanner 43 at each grid point. By the above processing, it is possible to prevent the ghost of the obstacle being out of the observation (scanning) range of the laser range scanner 43 from remaining similarly to the third embodiment.

The functions of the autonomous movement devices 100, 101, and 102 can also be implemented by a computer such as a general personal computer (PC). Specifically, in the above embodiments, it has been described that the programs for the autonomous movement control processing performed by the autonomous movement devices 100, 101, and 102 are stored in advance in the ROM of the memory 20. However, a computer capable of implementing the above functions may be configured by storing the programs in a computer-readable recording medium such as a flexible disk, a compact disc read only memory (CD-ROM), a digital versatile disc (DVD), and a magneto-optical disc (MO), distributing the programs, and loading and installing the programs into the computer.

The preferred embodiments of the present invention have been described above, but the present invention is not limited to the specific embodiments, and includes the invention described in the claims and the equivalent scope thereof. The invention described in the initial claims of the present application is added below.

What is claimed is:

1. An autonomous movement device comprising:
  a first sensor configured to detect that an obstacle exists by detecting a collision between the autonomous movement device and the obstacle;
  a second sensor configured to detect whether an obstacle exists from a distance without approaching the obstacle; and
  a processor configured to:
    record first information indicating an existence probability of the obstacle that the first sensor detects on a first environment map;
    record second information indicating an existence probability of the obstacle that the second sensor detects on a second environment map;

create an environment map by integrating the first environment map and the second environment map;

calculate information indicating an existence probability of the obstacle at a position on the environment map corresponding to a position of the obstacle, and record the information on the environment map using logarithm odds;

cancel the first information recorded on the first environment map from the first environment map by setting a first attenuating degree of the existence probability indicated by the first information to be greater as a time in which a condition that the first sensor continuously detects that the obstacle does not exist becomes longer;

cancel the second information recorded on the second environment map from the second environment map by setting a second attenuating degree of the existence probability indicated by the second information to be greater as a time in which a condition that the second sensor continuously detects that the obstacle does not exist becomes longer;

set a moving route so that the autonomous movement device does not contact with the obstacle corresponding to the information based on the information recorded on the environment map; and control the autonomous movement device to move based on the set moving route, wherein an amount by which the first attenuating degree is set to be greater is greater than an amount by which the second attenuating degree is set to be greater.

2. The autonomous movement device according to claim 1, wherein the processor records the information about the obstacle at the position of the obstacle on the environment map.

3. The autonomous movement device according to claim 2, wherein the processor adjusts, at a position on the first environment map, the first attenuating degree, depending on a number of times that the first sensor has detected that the obstacle exists at the position.

4. The autonomous movement device according to claim 3, wherein when the first sensor detects that the obstacle exists, the processor decreases, by a reference-obstacle adjusting value, the first attenuating degree at the position where the obstacle has been detected.

5. The autonomous movement device according to claim 1, wherein the processor is configured to:

decrease the first attenuating degree when the first sensor has detected that the obstacle exists, and decrease the second attenuating degree when the second sensor has detected that the obstacle exists, and wherein an amount by which the first attenuating degree is decreased is greater than an amount by which the second attenuating degree is decreased.

6. The autonomous movement device according to claim 3, wherein when the first sensor has detected that the obstacle does not exist, the processor increases, by a reference-non-obstacle adjusting value, the first attenuating degree at the position where the first sensor has detected that the obstacle does not exist.

7. A method for movement performed by an autonomous movement device, the method comprising:

detecting, by a first sensor, whether an obstacle exists by detecting whether the autonomous movement device has a collision with the obstacle;

detecting, by a second sensor, whether an obstacle exists from a distance without the autonomous movement device approaching the obstacle;

recording first information indicating an existence probability of the obstacle that the first sensor detects on a first environment map;

recording second information indicating an existence probability of the obstacle that the second sensor detects on a second environment map;

creating an environment map by integrating the first environment map and the second environment map;

calculating information indicating an existence probability of the obstacle at a position on the environment map corresponding to a position of the obstacle, and recording the information on the environment map using logarithmic odds;

cancelling the first information recorded on the first environment map from the first environment map by setting a first attenuating degree of the existence probability indicated by the first information to be greater as a time in which a condition that it is continuously detected by the first sensor that the obstacle does not exist becomes longer;

cancelling the second information recorded on the second environment map from the second environment map by setting a second attenuating degree of the existence probability indicated by the second information to be greater as a time in which a condition that it is continuously detected by the second sensor that the obstacle does not exist becomes longer;

setting a moving route so that the autonomous movement device does not contact with the obstacle corresponding to the information based on the information recorded on the environment map; and moving the autonomous movement device based on the set moving route, wherein an amount by which the first attenuating degree is set to be greater is greater than an amount by which the second attenuating degree is set to be greater.

8. A non-transitory computer-readable recording medium storing a program for causing a computer of an autonomous movement device to control execution of processes comprising:

detecting, by a first sensor, whether an obstacle exists by detecting whether the autonomous movement device has a collision with the obstacle;

detecting, by a second sensor, whether an obstacle exists from a distance without the autonomous movement device approaching the obstacle;

recording first information indicating an existence probability of the obstacle that the first sensor detects on a first environment map;

recording second information indicating an existence probability of the obstacle that the second sensor detects on a second environment map;

creating an environment map by integrating the first environment map and the second environment map;

calculating information indicating an existence probability of the obstacle at a position on the environment map corresponding to a position of the obstacle, and recording the information on the environment map using logarithmic odds;

cancelling the first information recorded on the first environment map from the first environment map by setting a first attenuating degree of the existence probability indicated by the first information to be greater as a time in which a condition that it is continuously detected by the first sensor that the obstacle does not exist becomes longer;

cancelling the second information recorded on the second environment map from the second environment map by setting a second attenuating degree of the existence probability indicated by the second information to be greater as a time in which a condition that it is continuously detected by the second sensor that the obstacle does not exist becomes longer;

setting a moving route so that the autonomous movement device does not contact with the obstacle corresponding to the information based on the information recorded on the environment map; and moving the autonomous movement device based on the set moving route, wherein an amount by which the first attenuating degree is set to be greater is greater than an amount by which the second attenuating degree is set to be greater.

* * * * *